(12) United States Patent
Saylor et al.

(10) Patent No.: US 10,021,083 B1
(45) Date of Patent: *Jul. 10, 2018

(54) PROVIDING CREDENTIAL INFORMATION

(71) Applicant: MicroStrategy Incorporated, Vienna, VA (US)

(72) Inventors: Michael J. Saylor, Vienna, VA (US); Hector Vazquez, Ashburn, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/878,365

(22) Filed: Oct. 8, 2015

Related U.S. Application Data

(63) Continuation of application No. 13/939,396, filed on Jul. 11, 2013, now Pat. No. 9,160,727.

(60) Provisional application No. 61/731,868, filed on Nov. 30, 2012.

(51) Int. Cl.
*H04L 29/00* (2006.01)
*H04L 29/06* (2006.01)

(52) U.S. Cl.
CPC .................. *H04L 63/08* (2013.01)

(58) Field of Classification Search
CPC ....................................................... H04L 63/08
See application file for complete search history.

(56) References Cited

U.S. PATENT DOCUMENTS

| | | | | |
|---|---|---|---|---|
| 6,023,762 | A * | 2/2000 | Dean | G06F 21/34 380/255 |
| 8,412,675 | B2 * | 4/2013 | Alvarado | G06Q 10/109 707/616 |
| 2007/0239988 | A1 * | 10/2007 | Atzmony | G06F 21/78 713/183 |
| 2010/0082491 | A1 | 4/2010 | Rosenblatt | |

* cited by examiner

*Primary Examiner* — Brandon S Hoffman
*Assistant Examiner* — Helai Salehi
(74) *Attorney, Agent, or Firm* — Fish & Richardson P.C.

(57) ABSTRACT

A server system maintains data indicative of credentials held by multiple different users. Each of the credentials has been issued by a credential granting authority that is separate from an entity that operates the server system. The server system receives selection data that indicates how credential data of a first user is to be made available to other users. Based on the selection data, the server system stores availability data that indicates how credential data of the first user is to be made available to the other users. The server system also maintains a location of a mobile computing device associated with the first user and, based on the availability data and the location, provides, to at least a second user, information about at least one credential held by the first user in association with an indication of the location.

20 Claims, 15 Drawing Sheets

Credentials:
- ☐ Professional Engineer
- ☑ Georgia Tech Alumnus
- ☐ Virginia Driver's License
- ☐ Georgetown Law Alumnus
- ☑ MicroStrategy Employee
- ☐ Member of Virginia Bar
- ☐ Member of DC Bar
- ☐ USPTO Registration

*1102*

*1104* → Transpond: ☑ Yes / No

Users: Georgia Tech Alums; MicroStrategy Employees  *1106*

Transpond To: Georgia Tech Campus; MicroStrategy Offices  *1108*

Transpond From: Public Areas; MicroStrategy Offices  *1110*

Timing: Monday – Friday; 8 AM to 7 PM  *1112*

Trigger: Transpond When User Signals Emergency  *1114*

Information:
- ☑ Name  ☑ Professional Profile
- ☐ Address  ☐ Personal Profile
- ☐ Phone Number
- ☑ Email

*1116*

( Save  *1118* )  ( Cancel  *1120* )

| Credential Identifier 1202 | Set To Transpond 1204 | User Permissions 1206 | Transpond To Location 1208 | Transpond From Location 1210 | Transpond Timing 1212 | Information To Transpond 1214 | Trigger Condition 1216 |
|---|---|---|---|---|---|---|---|
| UVA Alumnus | Yes | Owner of Same Credential | Anywhere | Anywhere | Anyday 8 AM to 8 PM | All | None |
| Certified Lifeguard | Yes | All | Any Aquatic Facility | Any Aquatic Facility | Anytime | Credential Only | None |
| VA Driver License | No | All | Anywhere | Anywhere | Anytime | Credential Only | None |
| Doctor | Yes | All | 100 Yards From Me | Anywhere | Anytime | Name, Phone Number | Emergency Reported |
| Hospital Employee | Yes | Coworkers Group | Anywhere | Public Places | Mon – Fri 8AM – 7 PM | Business Profile | Password For Private Place |
| Conference Attendee | Yes | Owner of Same Credential | Within One Mile Of Convention | Within One Mile Of Convention | Next 48 Hours | Business Profile | None |

PROVIDING CREDENTIAL INFORMATION

CROSS-REFERENCE TO RELATED APPLICATIONS

This application is a continuation (and claims the benefit of priority under 35 USC 120) of U.S. application Ser. No. 13/939,396, filed Jul. 11, 2013, now allowed, which claims the benefit of U.S. Provisional Application No. 61/731,868, filed Nov. 30, 2012. Both of these prior applications are incorporated by reference in their entirety.

TECHNICAL FIELD

This disclosure relates to providing credential information.

BACKGROUND

Private and public organizations issue credentials to persons, for example, to signify completion of a set of requirements or membership in a particular group. Persons may use the credentials to verify completion of the set of requirements or membership in the particular group.

SUMMARY

In one aspect, a method includes maintaining, by a server system, data indicative of credentials held by multiple different users, each of the credentials having been issued by a credential granting authority that is separate from an entity that operates the server system. The method also includes receiving, by the server system, selection data that indicates how credential data of a first user included in the multiple different users is to be made available to other users included in the multiple different users and, based on the selection data, storing, by the server system, availability data that indicates how credential data of the first user included in the multiple different users is to be made available to the other users included in the multiple different users. The method further includes maintaining, by the server system, a location of a mobile computing device associated with the first user and, based on the availability data and the location of the mobile computing device associated with the first user, providing, to at least a second user included in the multiple different users, information about at least one credential held by the first user in association with an indication of the location of the mobile computing device associated with the first user.

Implementations may include one or more of the following features. For example, the method may include receiving selection of one or more credentials held by the first user to make available to other users included in the multiple different users and, based on the selection of the one or more credentials, storing availability data that indicates the one or more credentials held by the first user that are available to other users included in the multiple different users. In this example, the method may include providing information about the one or more credentials held by the first user in association with an indication of the location of the mobile computing device associated with the first user.

In some implementations, the first user may hold multiple credentials maintained by the server system and the method may include receiving selection of a subset of less than all of the multiple credentials held by the first user to make available to other users included in the multiple different users. In these implementations, the method may include, based on the selection of the subset of the multiple credentials, storing availability data that indicates that the subset of the multiple credentials held by the first user are available to other users included in the multiple different users and the multiple credentials excluded from the subset are not available to other users included in the multiple different users. Further, in these implementations, the method may include providing information about the subset of the multiple credentials held by the first user in association with an indication of the location of the mobile computing device associated with the first user.

In some examples, the subset of the multiple credentials may include at least two credentials held by the first user. In these examples, the method may include providing information about the at least two credentials held by the first user in association with an indication of the location of the mobile computing device associated with the first user.

In addition, the method may include receiving user permissions that define users to which the credential data of the first user is available and, based on the user permissions, storing availability data that indicates the users to which the credential data of the first user is available. Also, the method may include determining, based on the availability data that indicates the users to which the credential data of the first user is available, that the second user is one of the users to which the credential data of the first user is available and, based on the determination that the second user is one of the users to which the credential data of the first user is available, providing, to the second user, information about at least one credential held by the first user in association with an indication of the location of the mobile computing device associated with the first user.

In some implementations, the method may include receiving destination data that defines one or more locations where the credential data of the first user is available and, based on the destination data, storing availability data that indicates the one or more locations where the credential data of the first user is available. In these implementations, the method may include determining a location of the second user, comparing the location of the second user to the one or more locations where the credential data of the first user is available, determining, based on the comparison, that the location of the second user corresponds to the one or more locations where the credential data of the first user is available, and, based on the determination that the location of the second user corresponds to the one or more locations where the credential data of the first user is available, providing, to the second user, information about at least one credential held by the first user in association with an indication of the location of the mobile computing device associated with the first user.

In some examples, the method may include receiving location data that defines one or more locations of the first user from which the credential data of the first user is available and, based on the location data, storing availability data that indicates the one or more locations of the first user from which the credential data of the first user is available. In these examples, the method may include determining a location of the first user, comparing the location of the first user to the one or more locations of the first user from which the credential data of the first user is available, determining, based on the comparison, that the location of the first user corresponds to the one or more locations of the first user from which the credential data of the first user is available, and, based on the determination that the location of the first user corresponds to the one or more locations of the first user from which the credential data of the first user is available, providing, to the second user, information about at least one credential held by the first user in association with an indication of the location of the mobile computing device associated with the first user.

The method may include receiving timing data that defines times at which the credential data of the first user is available and, based on the timing data, storing availability data that indicates the times at which the credential data of the first user is available. The method also may include determining a time when credential data of the first user is requested by the second user and comparing the time when credential data of the first user is requested by the second user to the times at which the credential data of the first user is available. The method further may include determining, based on the comparison, that the time when credential data of the first user is requested by the second user corresponds to the times at which the credential data of the first user is available and, based on the determination that the time when credential data of the first user is requested by the second user corresponds to the times at which the credential data of the first user is available, providing, to the second user, information about at least one credential held by the first user in association with an indication of the location of the mobile computing device associated with the first user.

In some implementations, the method may include receiving personalization data that defines information about the first user that is made available with the credential data of the first user and, based on the personalization data, storing availability data that indicates the information about the first user that is made available with the credential data of the first user. In these implementations, the method may include accessing the information about the first user that is made available with the credential data of the first user and providing, to the second user, information about at least one credential held by the first user in association with an indication of the location of the mobile computing device associated with the first user and the accessed information about the first user.

In some examples, the method may include receiving a triggering condition that defines an event that triggers availability of the credential data of the first user and, based on the triggering condition, storing availability data that indicates the event that triggers availability of the credential data of the first user. In these examples, the method may include detecting the event that triggers availability of the credential data of the first user and, based on the detection of the event that triggers availability of the credential data of the first user, providing, to the second user, information about at least one credential held by the first user in association with an indication of the location of the mobile computing device associated with the first user.

In some implementations, the method may include identifying credentials that the second user desires to view, determining, based on the stored availability data, a set of the identified credentials that are available to the second user, the set of the identified credentials including the at least one credential held by the first user, and providing, for each credential in the set, credential information in association with location information. In these implementations, the method may include identifying a type of credential that the second user desires to view, determining, based on the stored availability data, multiple credentials that are available to the second user and that match the type of credential that the second user desires to view, each of the multiple credentials being held by a different user, and providing, to the second user, an indication of each of the multiple credentials in association with a location corresponding to each of the multiple credentials. Further, in these implementations, the method may include identifying an area at which the second user desires to view credentials, determining, based on the stored availability data, multiple credentials that are available to the second user and that are each located within the area at which the second user desires to view credentials, each of the multiple credentials being held by a different user and the multiple credentials including credentials of different types, and providing, to the second user, an indication of each of the multiple credentials in association with a location corresponding to each of the multiple credentials.

In addition, the method may include providing, to a subset of multiple users included in the multiple different users, information about at least one credential held by the first user in association with an indication of the location of the mobile computing device associated with the first user. The method also may include periodically receiving, from the mobile computing device associated with the first user, an indication of a location of the mobile computing device associated with the first user and storing the received indication of the location of the mobile computing device associated with the first user. The method further may include periodically requesting, from the mobile computing device associated with the first user, an indication of a location of the mobile computing device associated with the first user, receiving, responsive to a request, an indication of a location of the mobile computing device associated with the first user, and storing the received indication of the location of the mobile computing device associated with the first user.

In some examples, the method may include receiving, from the first user, a first request to add a first type of credential to an account of the first user on the server system, the first type of credential being granted by a first credential granting authority and, based on the first request to add the first type of credential to the account of the first user on the server system, verifying with the first credential granting authority that the first credential granting authority has granted the first type of credential to the first user. In these examples, the method may include, based on verifying with the first credential granting authority that the first credential granting authority has granted the first type of credential to the first user, adding the first type of credential to the account of the first user and enabling the first user to make the first type of credential available to other users. Also, in these examples, the method may include receiving, from the first user, a second request to add a second type of credential to the account of the first user on the server system, the second type of credential being granted by a second credential granting authority, based on the second request to add the second type of credential to the account of the first user on the server system, verifying with the second credential granting authority that the second credential granting authority has not granted the second type of credential to the first user, and, based on verifying with the second credential granting authority that the second credential granting authority has not granted the second type of credential to the first user, denying the second request to add the second type of credential to the account of the first user and stopping the first user from making the second type of credential available to other users. The second type of credential may be different than the first type of credential, and the second credential granting authority may be different from the first credential granting authority;

In another aspect, a system includes at least one processor and at least one memory coupled to the at least one processor having stored thereon instructions which, when executed by the at least one processor, cause the at least one processor to perform operations. The operations include maintaining data indicative of credentials held by multiple different users, each of the credentials having been issued by a credential granting authority that is separate from an entity that operates the server system. The operations also include receiving selection data that indicates how credential data of a first user included in the multiple different users is to be made available to other users included in the multiple different users and, based on the selection data, storing availability data that indicates how credential data of the first user included in the multiple different users is to be made available to the other users included in the multiple different users. The operations further include maintaining a location of a mobile computing device associated with the first user and, based on the availability data and the location of the mobile computing device associated with the first user, providing, to at least a second user included in the multiple different users, information about at least one credential held by the first user in association with an indication of the location of the mobile computing device associated with the first user.

In yet another aspect, at least one computer-readable storage medium is encoded with executable instructions that, when executed by at least one processor, cause the at least one processor to perform operations. The operations include maintaining data indicative of credentials held by multiple different users, each of the credentials having been issued by a credential granting authority that is separate from an entity that operates the server system. The operations also include receiving selection data that indicates how credential data of a first user included in the multiple different users is to be made available to other users included in the multiple different users and, based on the selection data, storing availability data that indicates how credential data of the first user included in the multiple different users is to be made available to the other users included in the multiple different users. The operations further include maintaining a location of a mobile computing device associated with the first user and, based on the availability data and the location of the mobile computing device associated with the first user, providing, to at least a second user included in the multiple different users, information about at least one credential held by the first user in association with an indication of the location of the mobile computing device associated with the first user.

The details of one or more implementations are set forth in the accompanying drawings and the description, below. Other potential features of the disclosure will be apparent from the description and drawings, and from the claims.

BRIEF DESCRIPTION OF THE DRAWINGS

FIGS. 4-9 and 11 are diagrams illustrating example user interfaces for receiving user input that defines how credential data of a user is to be made available to other users.

FIG. 12 is a diagram illustrating an example data structure that stores availability data that indicates how credential data of a user is to be made available to the other users.

DETAILED DESCRIPTION

Techniques are described for providing credential information. The credential information may represent credentials that a user has been granted by one or more credential granting authorities. For instance, the credentials may be licenses issued by government organizations (e.g., a license to practice medicine), degrees issued by institutes of learning (e.g., a collegiate degree issued by a university), a status denoting membership in a particular group (e.g., a badge of employment issued by a company), or any type of credential an institute bestows on individuals. The credential information may be managed by a system operated by an entity that is separate from the credential granting authorities. The system may coordinate with the credential granting authorities to verify accuracy of credentials managed by the system and may make credential information available to other users in association with location data for the users that hold the credentials represented by the credential data. By verifying the accuracy of the credential information and making credential information available in association with location data, users may receive accurate information regarding locations of users that hold credentials of interest.

In some implementations, a mobile device-based credential management application enables a user to hold (or otherwise access) multiple different credentials on the user's mobile device. One or more of these credentials may be configured to be "activated" by the user to transpond information about the qualifications that the credentials represent and the location of the user. As such, the user may selectively choose which qualifications the user wants to broadcast to other users at any given time/location, and the other users may be made aware of the qualifications (or absence of qualifications) of those around them.

Figure 1:
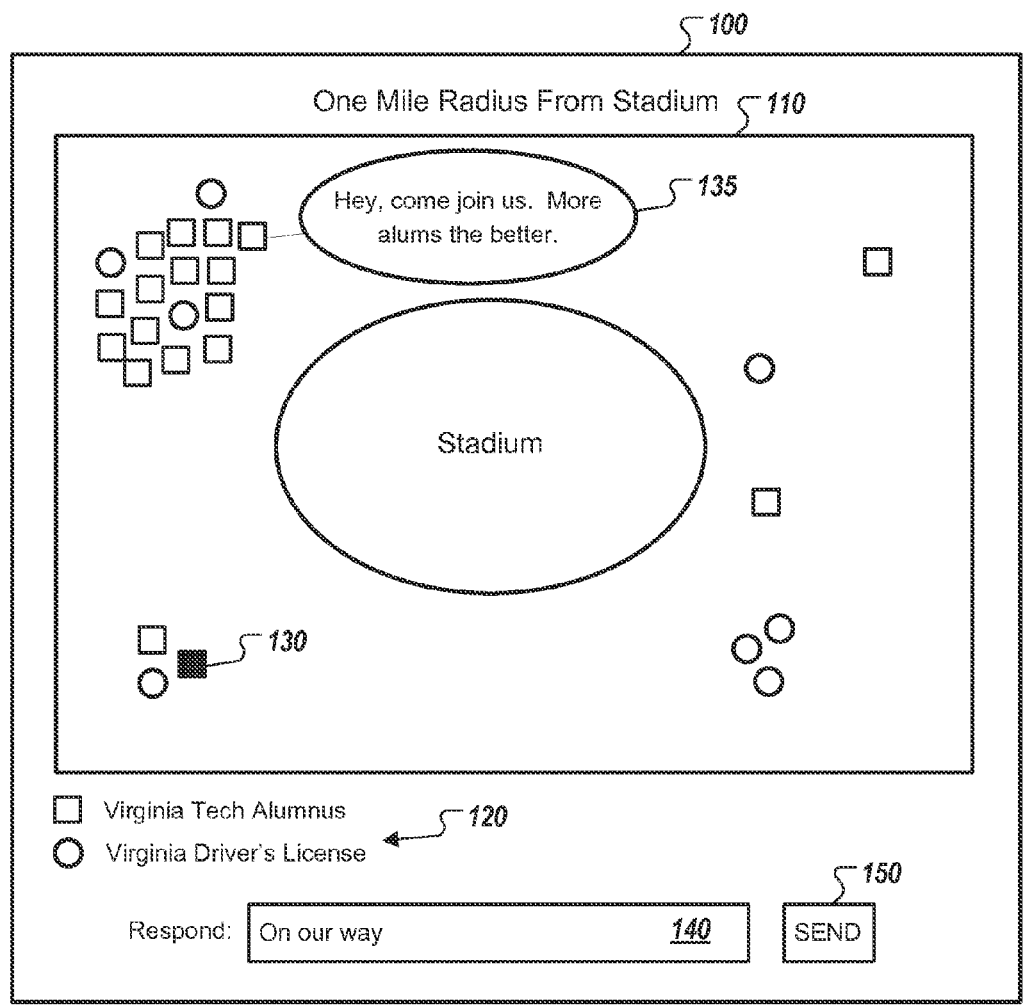
FIG. 1 is a diagram illustrating an example of a user interface for making credential data available to users.

FIG. 1 illustrates an example of a user interface for making credential data available to users. In the example shown in FIG. 1, a first user is an alumnus of Virginia Tech University and has traveled with two friends to a road football game where Virginia Tech is playing a team from another state. Because a majority of the crowd supports the home team from the other state, the first user would like to locate other fans of Virginia Tech that have travelled to the road football game. To assist with locating other fans of Virginia Tech that have travelled to the road football game, the first user begins operating a mobile device-based credential management application on the first user's mobile computing device (e.g., a mobile phone such as a smartphone or a tablet computer). The credential management application causes display of an interface 100 on the first user's mobile computing device. The interface 100 includes an interactive map 110 that displays credential information in association with location information.

In the example shown in FIG. 1, the first user has selected to view credentials of other users that are located within a one mile radius of the stadium where the football game is being played. In addition, the first user has selected to view Virginia Tech Alumni as the primary credential to display and users that have a Virginia Driver's License as the secondary credential to display. In this example, the first user selected these conditions because the first user is interested in locating other fans of Virginia Tech that have travelled to the road football game. Specifically, the first user placed a geographic limit on the credentials displayed because the first user is not interested in locating Virginia Tech fans that did not travel to the game. The first user selected Virginia Tech Alumni and users that have a Virginia Driver's License as the credentials to display because these credentials are likely to differentiate Virginia Tech fans from fans of the other team that are attending the game. For example, based on the first user placing the geographic limit on the credentials displayed, the mobile device identifies types of credentials that are available within the geographic area of interest and presents a list of the identified types of credentials. In this example, the mobile device enables the first user to select, from the list, one or more credentials of interest. As shown in FIG. 1, the first user selected a first credential of Virginia Tech Alumni and a second credential of users that have a Virginia Driver's License, while leaving other available credential types unselected.

Based on the selections made by the first user, the mobile device determines an area that is within a one mile radius of the stadium, accesses map data that is descriptive of the area that is within the one mile radius of the stadium, and displays the accessed map data as a background of the interactive map 110. The mobile device also identifies other users that have the credentials selected by the first user, that are currently located within a one mile radius of the stadium, and that have made one or more of the credentials selected by the first user available to a group of other users that include the first user. Based on the identification of other users that have the credentials selected by the first user and that are currently located within a one mile radius of the stadium, the mobile device updates the interactive map 110 to show the location of each user with an indication of the type of credential held. As shown, the mobile device displays a legend 120 that indicates users holding the credential of being a Virginia Tech Alumnus are identified using a square identifier and users holding the credential of having a Virginia Driver's License are identified using a circle identifier. For a user that is both a Virginia Tech Alumnus and holds a Virginia Driver's License, the mobile device may use the square identifier to indicate that the user is a Virginia Tech Alumnus because the first user selected Virginia Tech Alumnus as the primary credential to display.

As shown in the interactive map 110, a relatively large group of Virginia Tech Alumni and users with Virginia Driver's Licenses is located at the upper left portion of the interactive map 110. The mobile device identifies the first user on the interactive map 110 using a solid identifier 130. In this regard, the first user is able to perceive the location of himself and his two friends relative to the relatively large group of Virginia Tech Alumni and users with Virginia Driver's Licenses and join the relatively large group if desired.

Further, the other users identified in the interactive map 110 also may operate the credential management application on their mobile devices and perceive the location of the first user in association with an indication that the first user is a Virginia Tech Alumnus. In the example shown in FIG. 1, another user has perceived the location of the first user and the indication that the first user is a Virginia Tech Alumnus and has sent a message 135 to the first user inviting the first user to join the relatively large group. The message 135 is displayed on the interactive map 110 in association with the other user that sent the message 135. In this regard, the first user is able to view the message, determine the location of the other user that sent the message, and confirm that the message is from a Virginia Tech Alumnus. The first user may respond to the message 135 using the text box 140 and the send control 150. Accordingly, the first user is able to perceive other users that have credentials in which the first user is interested and that are located in an area in which the first user is interested and connect with those users through the credential management application.

In some implementations, the mobile device only is able to identify and display those users that have chosen to make the credentials of Virginia Tech Alumnus or Virginia Driver's License available to other users (e.g., transponded the credentials of Virginia Tech Alumnus or Virginia Driver's License). In these implementations, users may choose whether or not to make credential information available with location information and may select a subset of credentials that they hold to make available to other users. In addition, users may set conditions that define when the credentials are available and/or to which users the credentials are available. For instance, in the example shown in FIG. 1, users may set the credential of Virginia Tech Alumnus to be available only to other users that hold the credential of Virginia Tech Alumnus and that are located within a one mile radius of the stadium. In this regard, the credential of Virginia Tech Alumnus would not be available to users that are outside of a one-mile radius of the stadium and would not be available to users that are within a one-mile radius of the stadium, but that are not Virginia Tech Alumni. As described in more detail below, a server system may manage the credential data for the different users and communicate with the mobile devices to assist in performing the operations discussed with respect to FIG. 1.

In some examples, the first user and other users described with respect to FIG. 1 may have confidence in the credential information provided because the credentials have been verified with the authorities that granted the credentials. For example, for each credential shown as Virginia Tech Alumnus, Virginia Tech has verified that the user shown holding that credential is in fact an alumnus of Virginia Tech. Also, for each credential shown as Virginia Driver's License, the Virginia government has verified that the user shown holding that credential is in fact a licensed driver in Virginia.

In some implementations, the first user and other users described with respect to FIG. 1 may determine how much personal information to provide with the credential information and location information shown in FIG. 1. In these implementations, the users may determine to provide credential information only with no personal information, provide credential information with a subset of available personal information (e.g., name and email, but not address or phone number), or provide credential information with all available personal information (e.g., a full personal profile).

Figure 2:
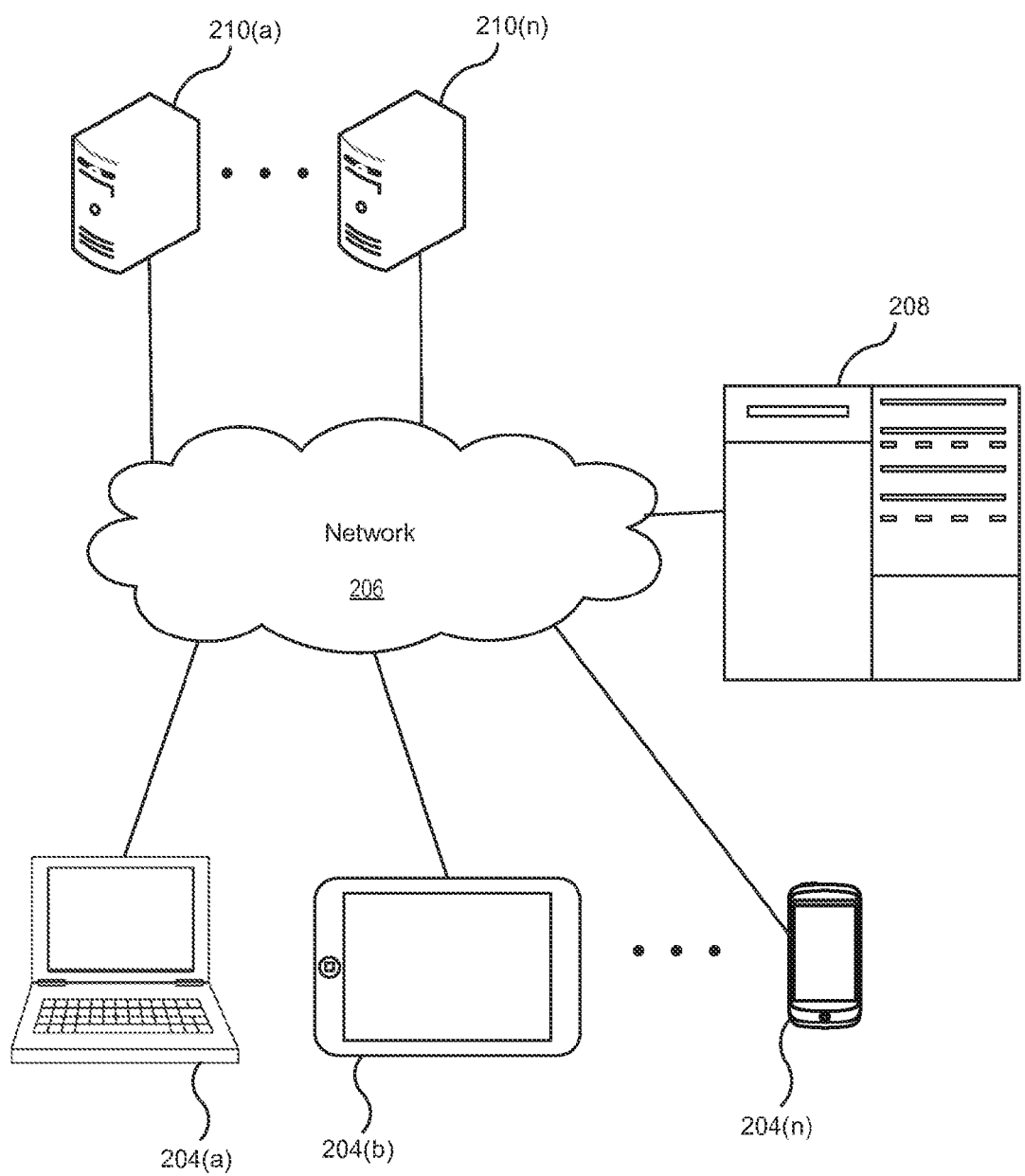
FIG. 2 is a block diagram illustrating an example of a communications system.

FIG. 2 illustrates an example of a communications system 200. For illustrative purposes, several elements illustrated in FIG. 2 and described below are represented as monolithic entities. However, these elements each may include and/or be implemented on numerous interconnected computing devices and other components that are designed to perform a set of specified operations.

As illustrated in FIG. 2, the communications system 200 includes a credential management server 208 that is accessible to a number of computing devices or other electronic devices 204(a)-204(n), including, for example, a laptop computer 204(a), a tablet computer 204(b), and a smartphone 204(n), over a network 206. In addition, the communications system 200 also includes a number of computing systems 210(a)-210(n) operated by credential granting authorities. The computing systems 210(a)-210(n) may be external to the server 208 and may be operated by entities that are different from the entity operating the server 208. The server 208 may be accessible to the computing systems 210(a)-210(n) over the network 206.

The server 208 may be implemented using one or more computing devices configured to provide a service to one or more client devices (e.g., electronic devices 204(a)-204(n)) connected to server 208 over network 206. The one or more computing devices may have internal or external storage components storing data and programs such as an operating system and one or more application programs. The one or more application programs may be implemented as instructions that are stored in the storage components and that, when executed, cause the one or more computing devices to provide the features of the server 208. Furthermore, the one or more computing devices each may include one or more processors for executing instructions stored in storage and/or received from one or more other electronic devices, for example over the network 206. In addition, these computing devices also typically may include network interfaces and communication devices for sending and receiving data.

The electronic devices 204(a)-204(n) may be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. Each of the electronic devices 204(a)-204(n) may have internal or external storage components for storing data and programs such as an operating system and one or more application programs. In particular, the internal or external storage components for each of the electronic devices 204(a)-204(n) may store a client application for interfacing with the server 208. Additionally or alternatively, the electronic devices 304(a)-304(n) may be configured to interface with the server 208 without a specific client application, using, for example, a web browser.

Each of the electronic devices 204(a)-204(n) also may include a central processing unit (CPU) for executing instructions stored in storage and/or received from one or more other electronic devices, for example over the network 206. Each of the electronic devices 204(a)-204(n) also may include one or more communication devices for sending and receiving data. One example of such communications devices is a modem. Other examples include antennas, transceivers, communications cards, and other network adapters capable of transmitting and receiving data over a network (e.g., the network 206) through a wired or wireless data pathway.

The network 206 may provide direct or indirect communication links between the server 208, the electronic devices 204(a)-204(n), and the computing systems 210(a)-210(n). Examples of the network 206 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

The computing systems 210(a)-210(n) each may be implemented using one or more computing devices (e.g., servers). The one or more computing devices may have internal or external storage components storing data and programs such as an operating system and one or more application programs. The one or more application programs may be implemented as instructions that are stored in the storage components and that, when executed, cause the one or more computing devices to provide the features ascribed herein to the computing systems 210(a)-210(n). Furthermore, the one or more computing devices each may include one or more processors for executing instructions stored in storage and/or received from one or more other electronic devices, for example, over the network 206. In addition, these computing devices also may include network interfaces and communication devices for sending and receiving data.

The server 208 enables users to store, manage, and access various different credentials through communications with the electronic devices 204(a)-204(n) over the network 206. The server 208 may serve as a central repository where all credential data for all users is stored and may control transponding of credentials for all users.

Alternatively, the electronic devices 204(a)-204(n) may store portions of the credential data and may assist with transponding of credentials. For example, the electronic device 204(n) may store information about the credentials associated with the user of the electronic device 204(n) and how those credentials should transpond. In this example, the electronic device 204(n) may transpond credentials using a short-range wireless communication protocol (e.g., when the electronic device 204(n) is unable to connect to the server 208).

Further, applications running on electronic devices 204(a)-204(n) may enable users to access credentials from the server 208 and/or interface with the server 208 to validate credentials. When credentials on the electronic devices 204(a)-204(n) are transponding, the applications executing on the electronic devices 204(a)-204(n) may periodically transmit location information for the electronic devices 204(a)-204(n) to the server 208. The server 208 may use the location information to generate visualizations of the location of the electronic devices 204(a)-204(n) and the credentials they are transponding. These visualizations may be provided to other users.

In addition, the server 208 may communicate with the computing systems 210(a)-210(n) over the network to verify credentials added to the server 208. For instance, when a user adds a credential to the user's account, the server 208 may send a communication to the computing system associated with the authority that grants that type of credential to verify whether that credential has actually been granted to the user attempting to add the credential.

Figure 3:
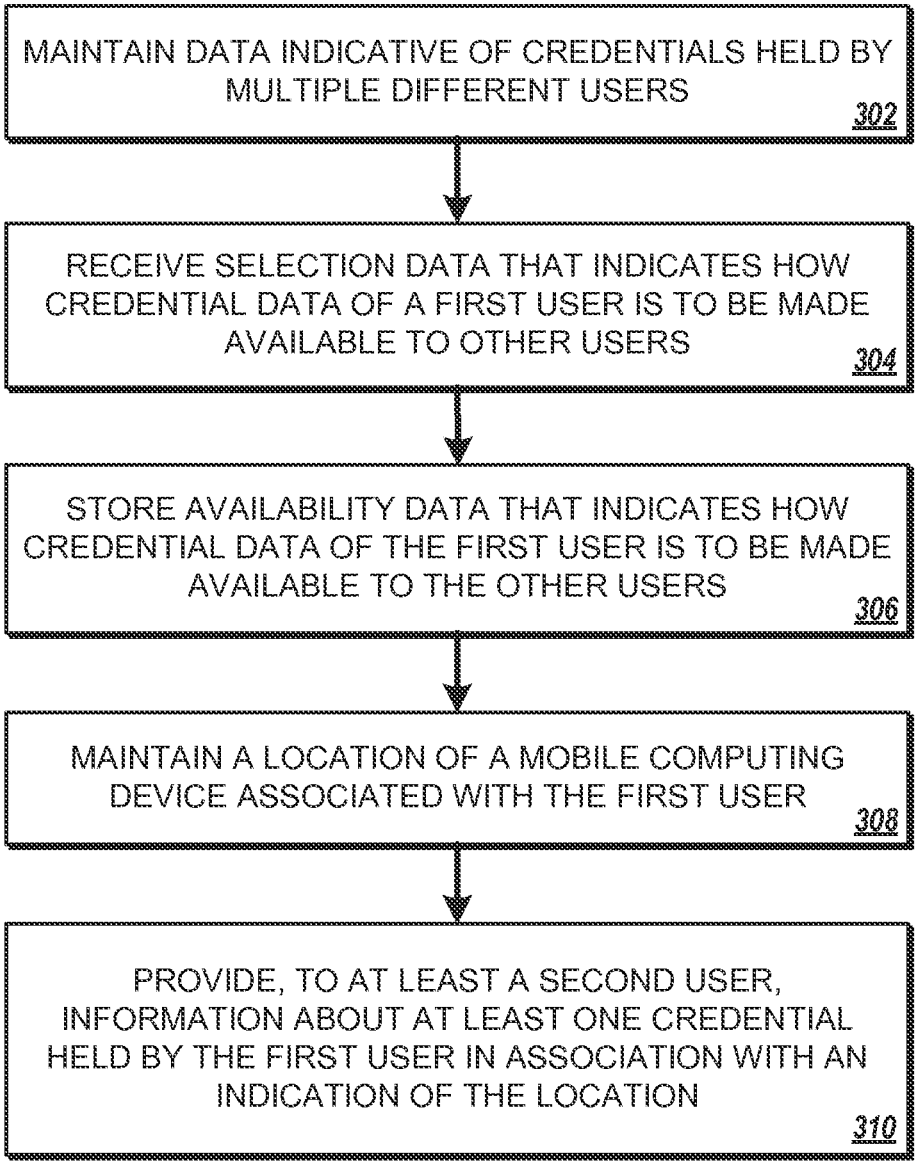
FIG. 3 is a flow chart illustrating an example process for controlling availability of credential data.

FIG. 3 illustrates an example process 300 for controlling availability of credential data. The operations of the process 300 are described generally as being performed by the system 200. The operations of the process 300 may be performed by one of the components of the system 200 (e.g., the server 208) or may be performed by a combination of the components of the system 200. In some implementations, operations of the process 300 may be performed by one or more processors included in one or more electronic devices.

The system 200 maintains data indicative of credentials held by multiple different users (302). For instance, the system 200 may maintain an account for each user of the system 200. Each account may include identification information for the user and credential data that defines the credentials held by the user. To establish an account, the system 200 may receive a request to establish an account from a new user and collect personal data of the new user. The system 200 then establishes the account for the new user by storing the personal data of the new user in association with a unique identifier for the account. Once the account has been established, the system 200 receives, from the new user, user input adding one or more credentials to the account of the new user and stores credential data that describes the one or more credentials in association with the unique identifier of the new user's account. The system 200 may maintain accounts for many different users with each user having a different account for the credential data held by the corresponding user.

In some examples, the system 200 verifies each of the credentials added to the system 200. In these examples, the system 200 communicates with credential granting authorities to confirm that credentials added to the system 200 were actually bestowed upon the users that are adding the credentials. For instance, when a first user adds a new credential (e.g., a degree from a university) to the first user's account, the system 200 identifies a credential granting authority (e.g., the university) that grants the type of credential the first user is attempting to add. The system 200 sends a request to a computing system associated with the identified credential granting authority (e.g., a computing system of the university) that includes the type of credential (e.g., the type of degree) and personal information for the first user (e.g., the first user's name). The computing system associated with the identified credential granting authority (e.g., the computing system of the university) evaluates the request and sends, to the system 200, a return message that verifies whether or not the first user was granted the credential (e.g., whether or not the first user received the degree from the university). The system 200 processes the return message and adds the credential to the first user's account based on the return message verifying that the credential is valid. Based on the return message indicating that the credential is invalid, the system 200 rejects the credential and blocks the first user from adding the credential to the first user's account. Accordingly, in these examples, all of the credentials are verified by the system 200 and, therefore, users of the system 200 can be confident that the credentials provided from the system 200 are valid.

In addition to or as an alternative to the system 200 communicating with credential granting authorities to confirm that credentials added to the system 200 were actually bestowed upon the users that are adding the credentials, the system 200 may enable a user desiring to add a particular credential to communicate with the credential granting authority that issued the particular credential and request that the credential granting authority add the particular credential to the user's account. Through the communication and request, the credential granting authority determines whether the user is entitled to the particular credential and whether the user is able to adequately authenticate himself or herself. Based on a determination that the user is entitled to the particular credential and that the user is able to adequately authenticate himself or herself, the credential granting authority makes the particular credential available to the system 200 and the system 200 adds the particular credential to the user's account. Based on a determination that the user is not entitled to the particular credential and/or that the user is unable to adequately authenticate himself or herself, the credential granting authority rejects the request of the user and does not make the particular credential available to the system 200. Consequently, the system 200 does not add the particular credential to the user's account and may track the denied request as part of the user's account.

In some implementations, the system 200 may maintain credentials in different verification states. In these implementations, the system 200 may accept all credentials added to the system 200 by users, but include a verification state that is displayed with the credential. For instance, instead of rejecting a credential that is identified as being invalid by the credential granting authority, the system 200 may add the credential, but associate the credential with a verification state of invalid. For credentials that are verified as being valid by a credential granting authority, the system 200 adds the credential and associates the credential with a verification state of valid. In addition, the system 200 may add credentials that the system 200 cannot verify with a credential granting authority or that the system 200 cannot verify with a credential granting authority right away. For these credentials, the system 200 may add the credentials and associate the credentials with a verification state of unverified. In this regard, the system 200 provides credential information with an indication of whether the credential is confirmed valid, confirmed invalid, or unverified. The system 200 may change the verification state of a credential whenever the system 200 determines that the credential has a different verification state than currently associated with the credential.

The system 200 receives selection data that indicates how credential data of a first user is to be made available to other users (304). For example, the system 200 may receive selection data selecting one or more credentials that the first user would like to make available to the other users of the system 200. In this example, the system 200 may receive selection data selecting all of the credentials held by the first user to make available to other users or selecting any subset of the credentials held by the first user to make available to other users.

In some implementations, the system 200 also receives selection data selecting conditions that restrict the manner in which credentials held by the first user are made available to other users. In these implementations, the system 200 may receive conditions that are placed on all credentials the first user has made available or may apply different conditions to different credentials held by the user. Based on the conditions set, the system 200 evaluates the conditions that restrict the manner in which credentials held by the first user are made available to other users and makes the credentials available to other users in accordance with the conditions. As described throughout this disclosure, the conditions may restrict which users are able to view the credentials, restrict the locations where the credentials are available, restrict the locations of the first user from which the credentials are made available, restrict timing of when the credentials are available, restrict the information that is made available with credential and location information, and/or restrict availability of the credentials to instances of certain triggering events.

FIGS. 4-9 illustrate example user interfaces for receiving user input that defines how credential data of a user is to be made available to other users. The example user interfaces may be used in receiving selection data that indicates how credential data of a first user is to be made available to other users described above with respect to reference numeral 304.

Figure 4:
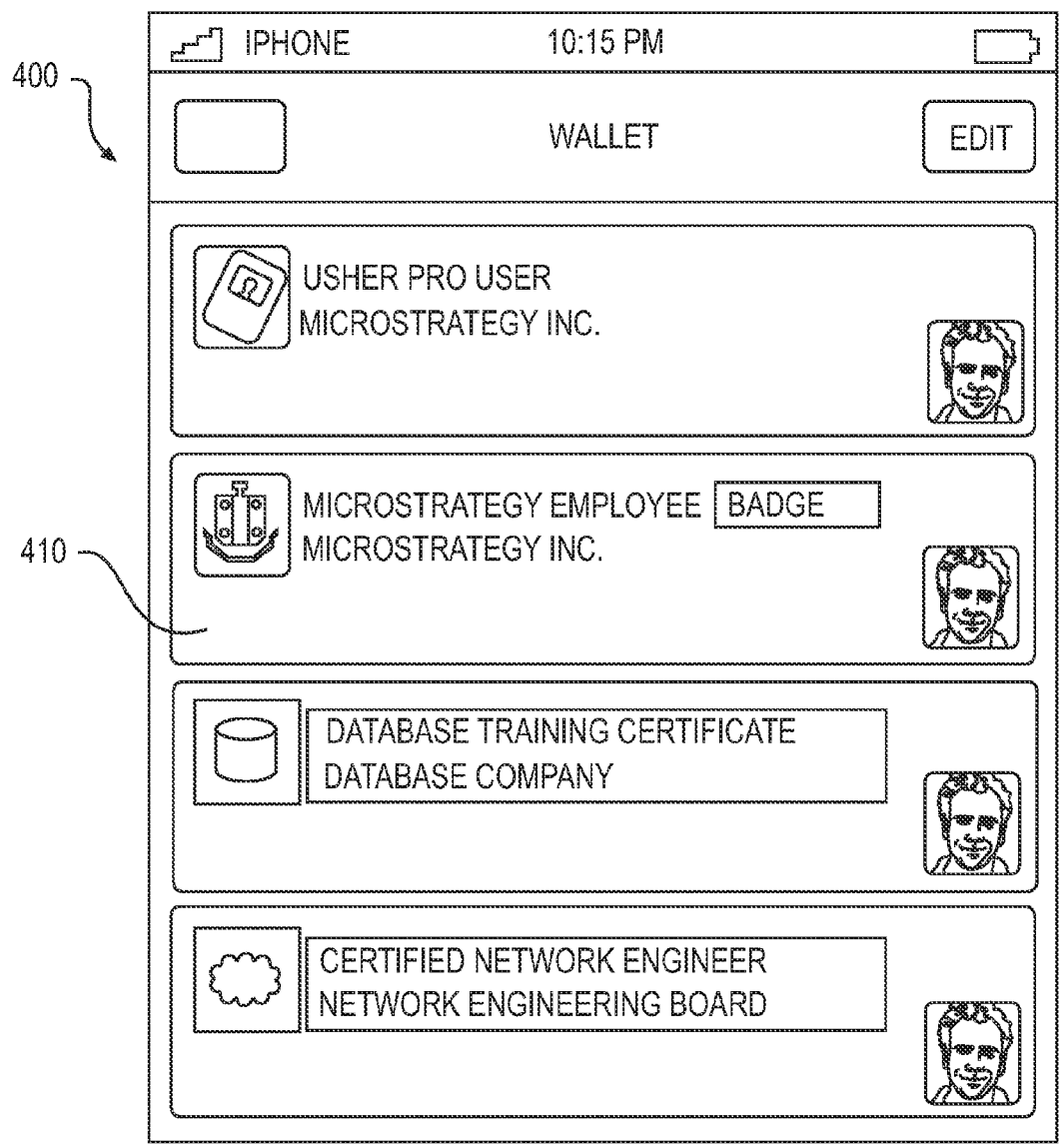

For example, FIG. 4 illustrates an example user interface 400 that shows a list of credentials held by a particular user. In this example, the user interface 400 shows a user's wallet that provides the user with access to numerous different credentials of the user. The user may select any one of the user's credentials from the user's wallet in order to access that credential on the user's mobile device. For instance, when the user selects the credential 410, the user's mobile device makes the credential 410 accessible as illustrated in FIG. 5.

Figure 5:
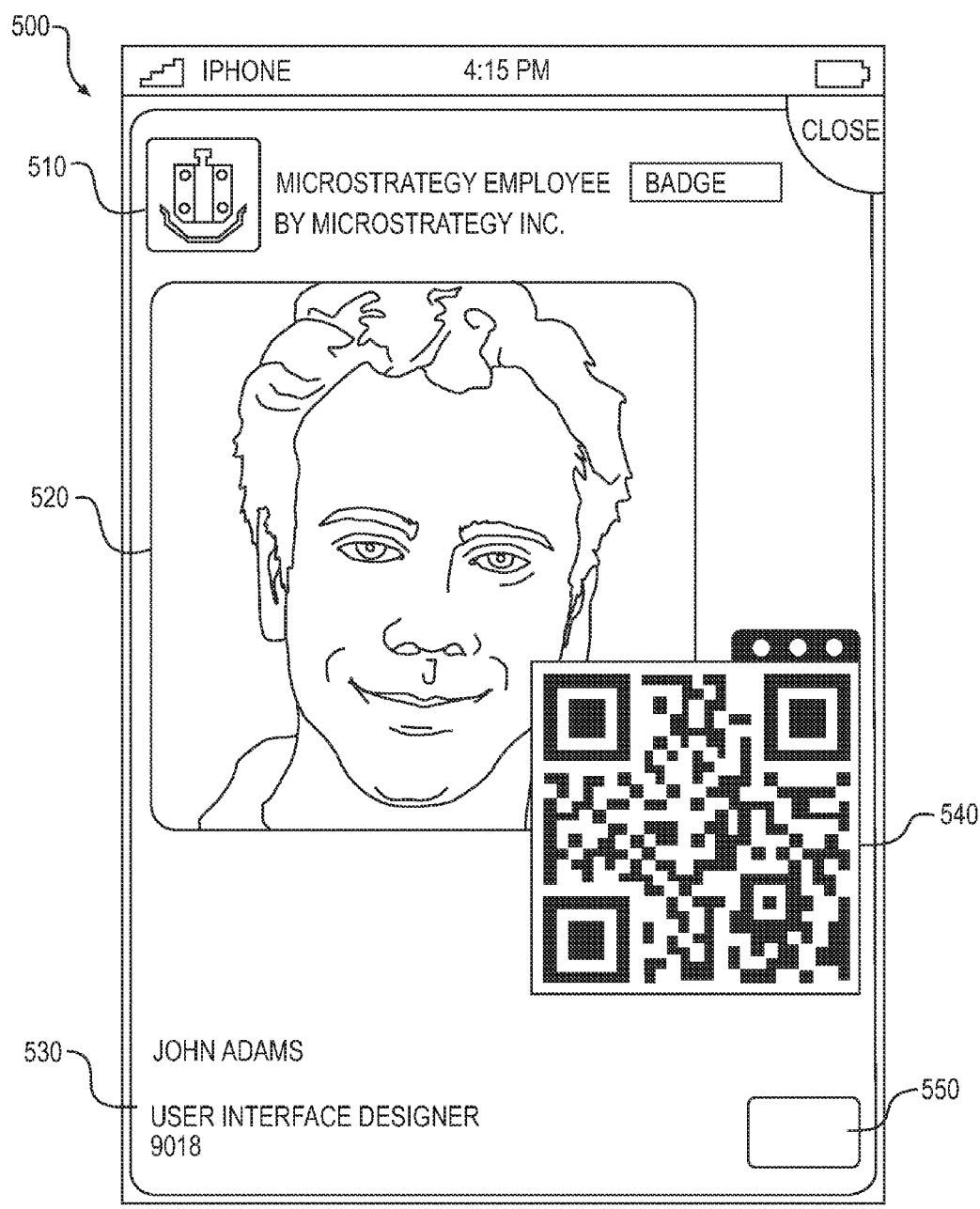

FIG. 5 illustrates an example user interface 500 that displays a selected credential. The user interface 500 includes a description 510 of the selected credential and a picture 520 of the user that holds the credential. Also, the user interface 500 includes personal information 530 of the user that holds the credential and an identifier 540 that identifies the credential held by the user and that may enable validation of the credential by other users. As shown, the identifier 540 may be a QR code. The user interface 500 further includes a button 550 that causes additional information about the credential to be displayed and also causes a button to be presented that enables credential transponding to be activated. For instance, when the user selects the button 550, the user's mobile device displays the interface illustrated in FIG. 6.

Figure 6:
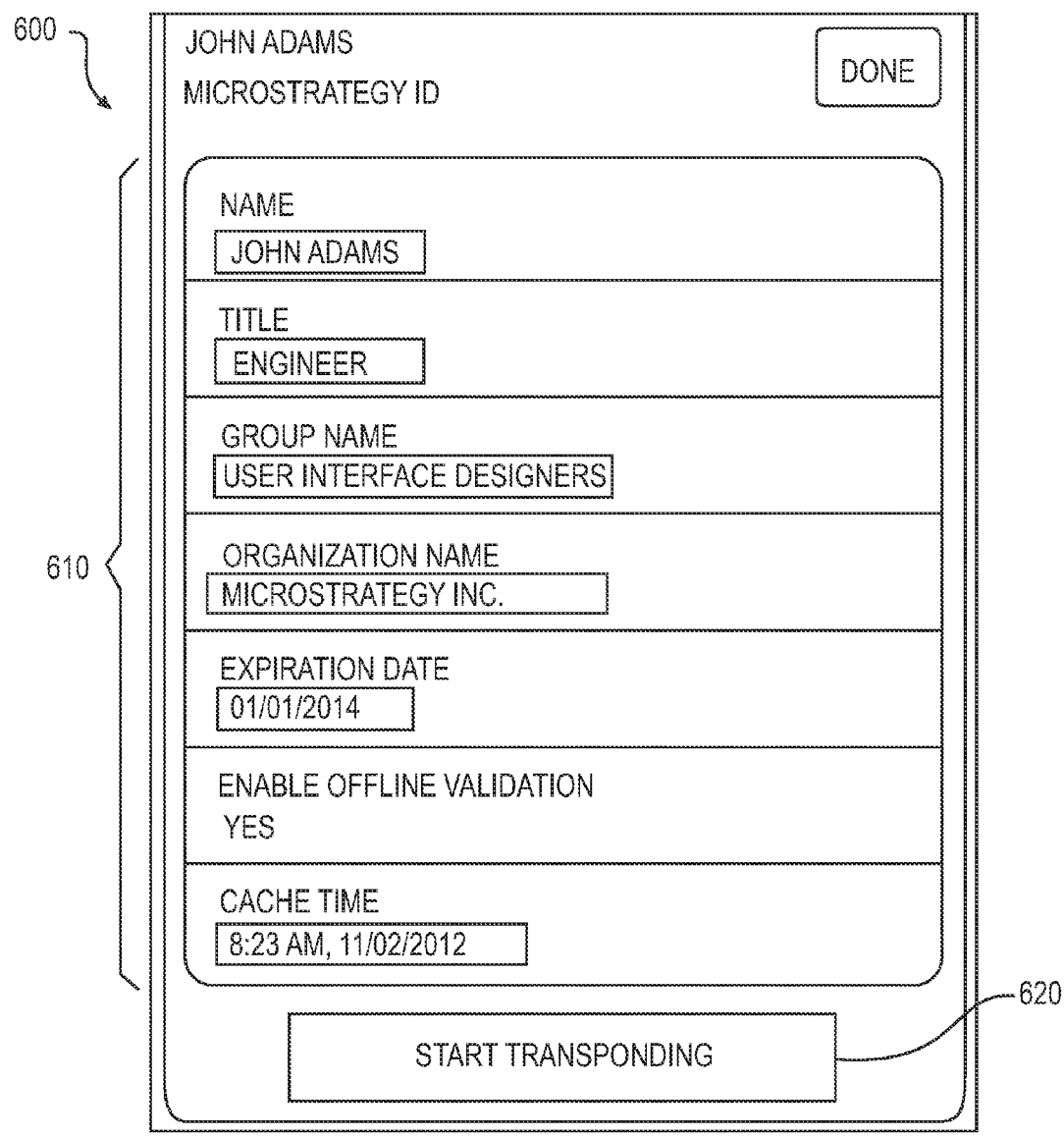

In some implementations, the user interface 500 represents a front of an employee badge and the interface illustrated in FIG. 6 represents a back of the employee badge. In these implementations, when the user selects the button 550, the system 200 displays an animation that makes it appear as if the employee badge is being flipped from the front of the badge represented by the user interface 500 to the back of the badge represented by the interface illustrated in FIG. 6.

FIG. 6 illustrates an example user interface 600 that displays additional information 610 about the credential and a button 620 that enables credential transponding to be activated. The additional information 610 includes a Name associated with the credential, a Title associated with the credential, a Group Name associated with the credential, an Organization Name associated with the credential, an Expiration Date associated with the credential, an Enable Offline Validation option associated with the credential, and a Cache Time associated with the credential. The button 620 enables a user to elect to start transponding the credential. By transponding the credential, the user makes the credential (or data about the credential) available to other users in association with location information for the user that holds the credential. When the user selects the button 620, the user's mobile device displays the interface illustrated in FIG. 7.

Figure 7:
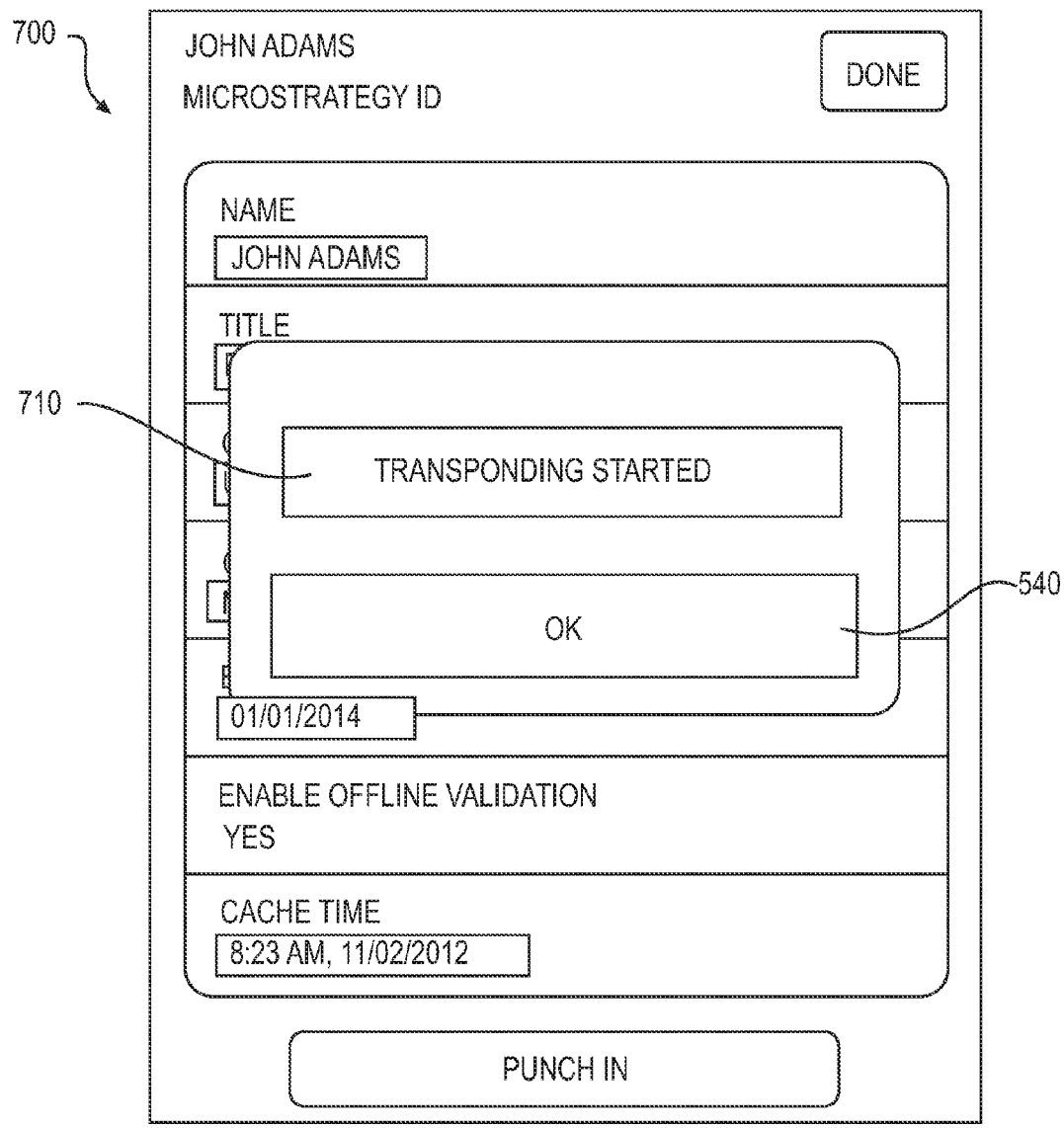

FIG. 7 illustrates an example user interface 700 that displays a message 710 that asks the user to confirm that it is acceptable that the credential will start transponding. The user interface 700 also includes a button 720 that confirms that the credential should start transponding. Selection of the button 720 causes the credential to start transponding information about the credential and the location of the user to other users.

Using techniques described above with respect to FIGS. 4-7, the user may activate as many (or as few) of the user's credentials (e.g., the credentials illustrated in FIG. 4) to transpond as the user desires. As such, at any point in time, the user may be transponding none or any number of different credentials.

Figure 8:
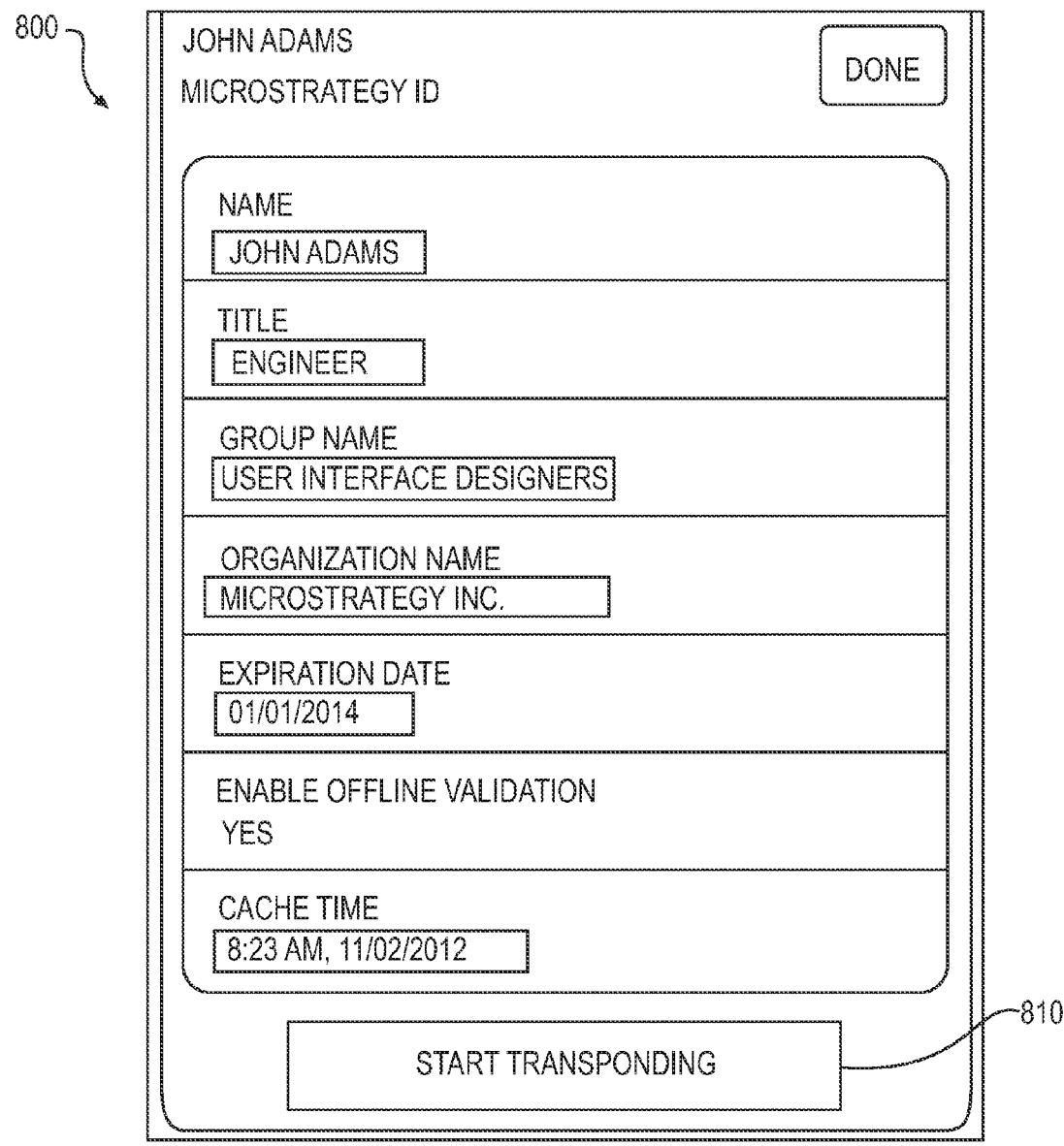

FIG. 8 illustrates an example user interface 800 that displays a button 810 that enables a user to stop transponding a credential. When a user who has been transponding a credential desires to turn off the transponding credential, the user may select the button 810 to turn off the transponding credential. The user interface 800 is essentially the same as the user interface 600, except that the button 810 enables the user to stop transponding the credential since the credential is transponding at a time when the user interface 800 is displayed. When the user selects the button 810, the user's mobile device displays the interface illustrated in FIG. 9.

Figure 9:
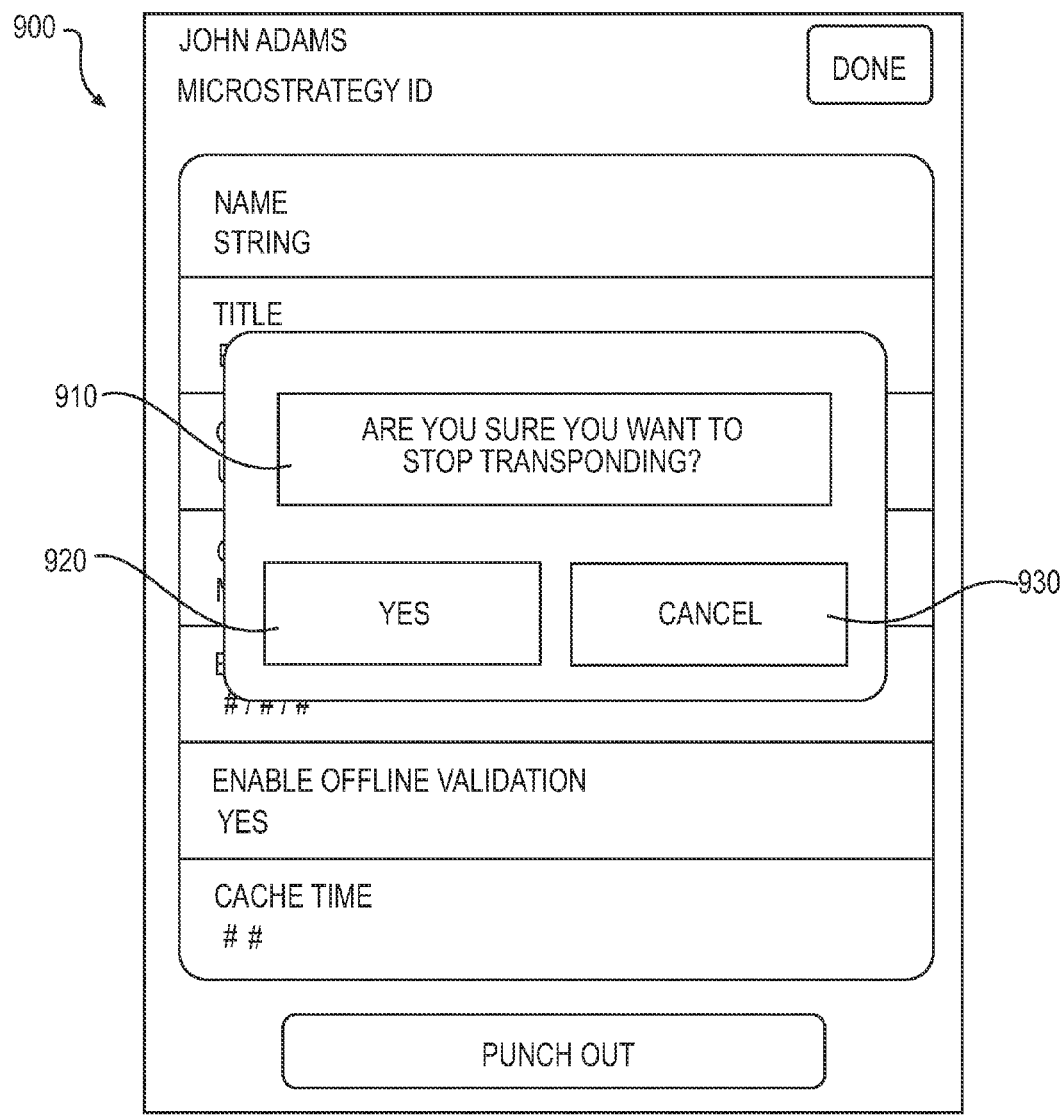

FIG. 9 illustrates an example user interface 900 that displays a message 910 that asks the user to confirm whether it is acceptable that the credential will stop transponding. The user interface 900 also includes a button 920 that confirms that the credential should stop transponding and a button 930 that cancels the input that causes the credential to stop transponding. Selection of the button 920 causes the credential to stop transponding information about the credential and the location of the user to other users and selection of the button 930 allows the credential to continue transponding information about the credential and the location of the user to other users.

Figure 10:
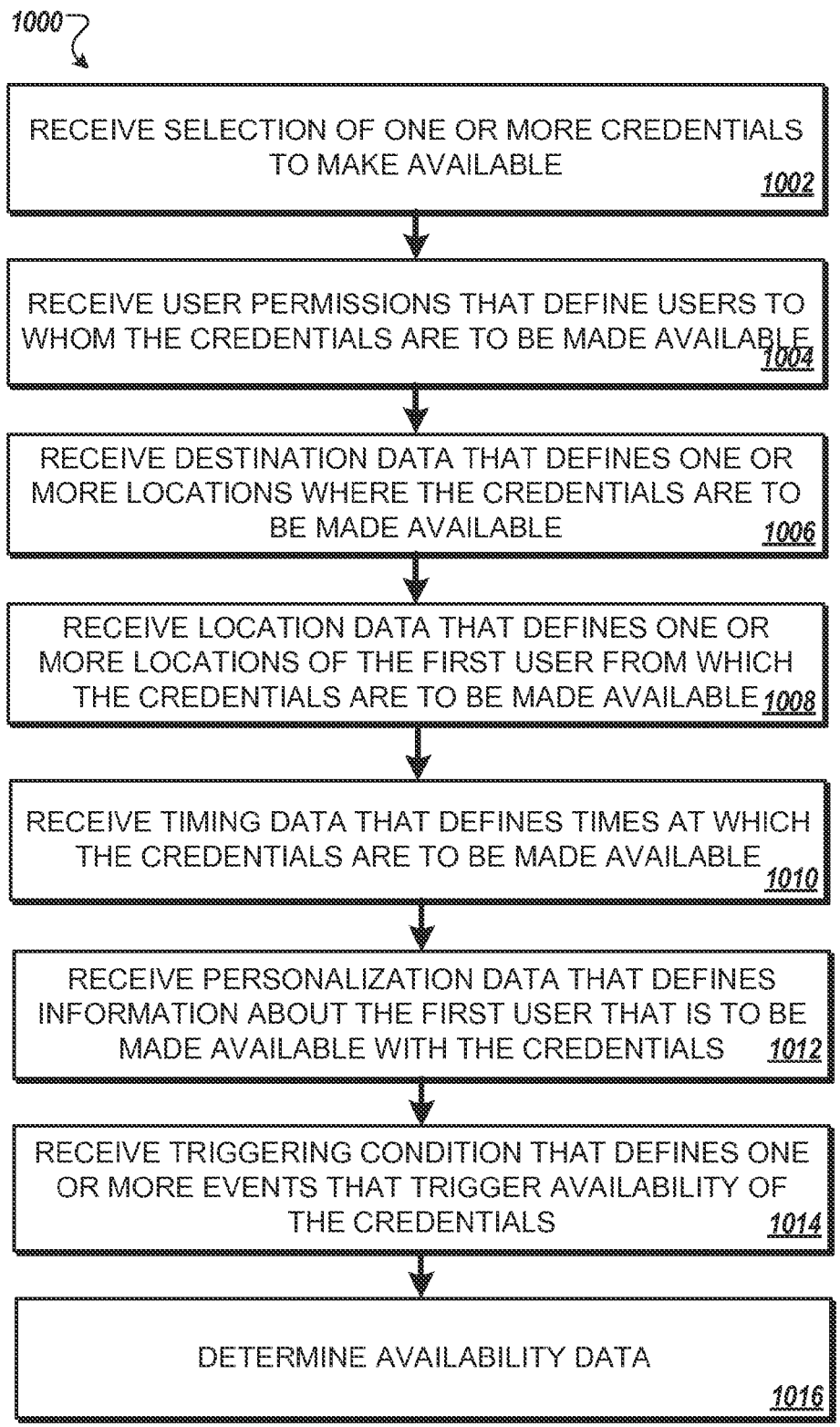
FIG. 10 is a flow chart illustrating an example process for determining availability data that indicates how credential data of a user is to be made available to the other users.

FIG. 10 illustrates an example process 1000 for determining availability data that indicates how credential data of a user is to be made available to the other users. The process 1000 may be used in receiving selection data that indicates how credential data of a first user is to be made available to other users referenced above with respect to reference numeral 320. The operations of the process 1000 are described generally as being performed by the system 200. The operations of the process 1000 may be performed by one of the components of the system 200 (e.g., the server 208) or may be performed by a combination of the components of the system 200. In some implementations, operations of the process 1000 may be performed by one or more processors included in one or more electronic devices.

The system 200 receives selection of one or more of a user's credentials to make available (1002). For instance, the system 200 may receive data selecting to make all of the user's credentials available, data selecting to make none of the user's credentials available, or data selecting to make a subset of the user's credentials available. The system 200 may enable a user to select any combination of credentials to make available and may enable a user to add, remove, and change the availability of credentials at any time.

The system 200 receives user permissions that define users to whom the credentials are to be made available (1004). For example, the system 200 receives user permissions that restrict the set of other users that are able to access the credentials. In this example, the system 200 may receive user permissions that make credentials available to all other users, user permissions that limit availability of the credentials to a subset of known users defined by the credential holder, or user permissions that limit availability of the credentials to a subset of users that also hold the same credentials. The system 200 may enable a user to define any type of user permissions that restrict availability of the user's credentials to those other users to whom the user has chosen to make the user's credentials available. The system 200 may define the user permissions as applying to multiple credentials of the user (e.g., all of the credentials of the user) or may define the user permissions on a per credential basis such that each credential has a different set of user permissions.

The system 200 receives destination data that defines one or more locations where the credentials are to be made available (1006). For instance, the system 200 may receive destination data that defines a static geographic region where other users must be located to receive the credential data. The system 200 also may receive destination data that defines a dynamic geographic region where other users must be located to receive the credential data or information about the credential (e.g., a region that is within a one mile radius of the user). The system 200 may enforce the destination data by comparing locations of users that are attempting to view the credential data with the destination data and providing the credential data to those users located within an area defined by the destination data. The system 200 also may enforce destination data by controlling a medium over which credential and location information is provided. For a relatively short distance from the user, the system 200 may make the credential and location information available over a short-range wireless communication protocol, which necessarily restricts how far the credential and location information is provided. The system 200 may enable a user to define any type of destination data that restricts availability of the user's credentials to specific areas or locations. The system 200 may define the destination data as applying to multiple credentials of the user (e.g., all of the credentials of the user) or may define the destination data on a per credential basis such that each credential has different destination data.

The system 200 receives location data that defines one or more locations of the first user from which the credentials are to be made available (1008). For instance, the system 200 may receive location data that defines a static geographic region where the user must be located for the credential data to be made available to other users. The system 200 also may receive location data that defines a dynamic geographic region where the user must be located for the credential data to be made available to other users (e.g., a region that is located within a one mile radius of the user's car). The system 200 may enable a user to define any type of location data that restricts availability of the user's credentials to instances in which the first user is located in specific areas or locations. The system 200 may define the location data as applying to multiple credentials of the user (e.g., all of the credentials of the user) or may define the location data on a per credential basis such that each credential has different location data.

The system 200 receives timing data that defines times at which the credentials are to be made available (1010). For example, the system 200 may receive timing data that defines days of the week on which the credentials are to be made available and/or times of day that the credentials are to be made available. The system 200 also may receive timing data that defines a particular amount of time that the credentials are to be made available (e.g., one week). The system 200 may enable a user to define any type of timing data that restricts availability of the user's credentials to specific times. The system 200 may define the timing data as applying to multiple credentials of the user (e.g., all of the credentials of the user) or may define the timing data on a per credential basis such that each credential has different timing data.

The system 200 receives personalization data that defines information about the first user that is to be made available with the credentials (1012). For instance, the system 200 may receive personalization data that defines the personal information of the first user that is to be made available with credential and location information. No personal information may be made available or any subset of personal information may be made available. The personal information may include name, address, phone number, email address, profile information, or any type of personal information that a user chooses to make available with credential data. The system 200 may enable a user to define any type of personalization data that defines information of the user that is to be made available with credentials. The system 200 may define the personalization data as applying to multiple credentials of the user (e.g., all of the credentials of the user) or may define the personalization data on a per credential basis such that each credential has different personalization data.

The system 200 receives a triggering condition that defines one or more events that trigger availability of the credentials (1014). For example, the system 200 may receive a triggering condition that indicates that credential data should be made available responsive to an event, such as identification of an emergency situation or entry of password. In this example, when the triggering condition is identification of an emergency situation, the system 200 provides credential and location information to a user that provides input indicating that an emergency has occurred. To reduce harassment, the system 200 may employ a policing policy that blocks certain users that have been identified as reporting false emergencies. The system 200 may enable a user to define any type of triggering conditions that restrict availability of the user's credentials to specific events. The system 200 may define triggering conditions as applying to multiple credentials of the user (e.g., all of the credentials of the user) or may define the triggering conditions on a per credential basis such that each credential has a different triggering condition.

The system 200 determines availability data based on the selection of one or more credentials to make available, the user permissions that define users to which the credentials are to be made available, the destination data that defines one or more locations where the credentials are to be made available, the location data that defines one or more locations of the first user from which the credentials are to be made available, the timing data that defines times at which the credentials are to be made available, the personalization data that defines information about the first user that is to be made available with the credentials, and/or the one or more triggering conditions that define events that trigger availability of the credentials (1016). The system 200 may define availability based on any combination of user input received in the operations of FIG. 10. Although FIG. 10 illustrates several types of user input being received, the system 200 may receive a subset of the type of user input identified and define availability data based on the subset of user input received. In addition, although FIG. 10 illustrates types of user input being received in a certain order, the order may be different and, in fact, all (or some portions) of the user input may be received in parallel, rather than sequentially. The system 200 may determine availability data as applying to multiple credentials of the user (e.g., all of the credentials of the user) or may determine availability data on a per credential basis such that each credential has a different availability data.

FIG. 11 illustrates an example user interface 1100 for receiving user input that defines how credential data of a user is to be made available to other users. The example user interface 1100 may be used in receiving data described above with respect to FIG. 10. The user interface 1100 includes a credential selection area 1102 that receives user input defining which credentials the user would like to make available to other users. As shown, the credential selection area 1102 has received selection of two out of the eight credentials owned by the user to control transponding.

The user interface 1100 also includes a checkbox 1104 that receives user input to indicate whether the selected credentials should transpond or should not transpond. As shown, the checkbox 1104 has received user input indicating that the selected credentials should transpond.

The user interface 1100 further includes a user definition area 1106, a transpond to definition area 1108, a transpond from definition area 1110, a timing definition area 1112, and a trigger definition area 1114. The user definition area 1106 receives user input defining user permissions that indicate to which other users the selected credentials will transpond when they are set to transpond. As shown, the user definition area 1106 has received user input defining that the selected credentials should transpond to other users that hold the credential of being a Georgia Tech Alumnus or that hold the credential of being a Microstrategy Employee.

The transpond to definition area 1108 receives user input defining locations to which the selected credentials will transpond when they are set to transpond. As shown, the transpond to definition area 1108 has received user input defining that the selected credentials should transpond to locations that are designated as the Georgia Tech Campus or locations that are designated as a Microstrategy Office. Thus, the system 200 will only make the selected credentials available to other users that are located at the Georgia Tech Campus or at a Microstrategy Office.

The transpond from definition area 1110 receives user input defining locations of the user from which the selected credentials will transpond when they are set to transpond. As shown, the transpond from definition area 1110 has received user input defining that the selected credentials should transpond from locations that are designated as Public Areas or locations that are designated as a Microstrategy Office. Thus, the system 200 will only make the selected credentials available to other users when the user is located in a Public Area or at a Microstrategy Office.

The timing definition area 1112 receives user input defining timing of when the selected credentials will transpond when they are set to transpond. As shown, the timing definition area 1112 has received user input defining that the selected credentials should transpond Monday through Friday between the hours of eight in the morning to seven in the evening. Thus, the system 200 will only make the selected credentials available to other users Monday through Friday between the hours of eight in the morning to seven in the evening.

The trigger definition area 1114 receives user input defining a trigger condition that causes the selected credentials to transpond when they are set to transpond. As shown, the trigger definition area 1114 has received user input defining that the selected credentials should transpond when another user signals that an emergency situation exists. Thus, the system 200 will make the selected credentials available to another user that provides input to the system 200 indicating that an emergency situation exists, even though other conditions for transponding the selected credentials do not exist.

The user interface 1100 includes an information definition area 1116 that receives user input defining which information about the user should transpond with the selected credentials. The information definition area 1116 includes multiple checkboxes that allow a user to select which information should transpond with the selected credentials. The user may select to transpond the credential alone with no information by selecting none of the checkboxes, may select to transpond the credential with all information by selecting all of the checkboxes, or may select to transpond the credential with any subset of information by selecting any subset of the checkboxes. As shown, the information definition area 1116 has received user input indicating that the user's name, email address, and professional profile should transpond with the selected credentials, but that the user's address, phone number, and personal profile should not.

In addition, the user interface 1100 includes a save button 1118 to save the settings entered in the user interface 1100, which causes the system 200 to begin transponding the selected credentials in accordance with the conditions set in the user interface 1100. The user interface 1100 includes a cancel button 1120 to cancel the settings entered in the user interface 1100 and maintain a current state of transponding credentials without changes. The user interface 1100 may be displayed at any time to allow the user to add new credentials to transpond, discontinue transponding of credentials that were previously set to transpond, and change conditions of how credentials are transponding.

Referring again to FIG. 3, the system 200 stores availability data that indicates how credential data of the first user is to be made available to the other users (330). For example, the system 200 stores data indicating which credentials are to be made available to other users and conditions on how those credentials are to be made available to the other users. In this example, the system 200 may store availability data that indicates any set of one or all credentials of the first user are to be made available to other users and, for each credential, availability data that indicates restrictions on how the credential is to be made available to other users. The system 200 may store any combination of the availability data described above as being determined with respect to reference numeral 1016.

FIG. 12 illustrates an example data structure 1200 that stores availability data that indicates how credential data of a user is to be made available to the other users. The data structure 1200 may be used in storing availability data described above with respect to reference numeral 330. The data structure 1200 stores credential data for a particular user and the system 200 may include data stored in the data structure 1200 for each of the multiple, different users for which the system 200 maintains credentials.

The data structure 1200 includes a first column 1202 for a credential identifier that uniquely identifies the credential and a second column 1204 that indicates whether or not the credential is set to transpond. In some examples, the credential identifier may be represented as an identification number and the values shown in the first column 1202 represent the credential type. A third column 1206 indicates user permissions associated with the credential and a fourth column 1208 defines a transpond to location associated with the credential. A fifth column 1210 defines a transpond from location associated with the credential and a sixth column 1212 defines transpond timing associated with the credential. A seventh column 1214 defines information that transponds with the credential and an eighth column 1216 defines a trigger condition that initiates transponding of the credential.

The data structure 1200 includes a first record 1220 that defines how a first credential for a user transponds to other users. The first record 1220 indicates that the first credential is for a University of Virginia Alumnus and that the first credential is set to transpond. The first credential has user permissions set that the first credential should only transpond to other users that own the same credential. Thus, the first credential only transponds to users that own the credential of University of Virginia Alumnus. The first credential also transponds to any location and transponds from any location of the user. In terms of timing, the first credential transponds any day from eight in the morning to eight in the evening. All information about the user that holds the first credential that is associated with the first credential transponds with the first credential and no trigger conditions exist for the first credential.

The data structure 1200 includes a second record 1222 that defines how a second credential for the user transponds to other users. The second record 1222 indicates that the second credential is for a Certified Lifeguard and that the second credential is set to transpond. The second credential has user permissions set that the second credential transponds to all users. The second credential also transponds to any aquatic facility and transponds from any aquatic facility. Accordingly, the second credential transponds when the user is located at an aquatic facility, but does not transpond when the user is located at a location other than an aquatic facility. Also, the second credential only transponds to other users that are located at an aquatic facility (e.g., only transponds to users located at the same aquatic facility as the user). In terms of timing, the second credential transponds anytime. Only information about the second credential of the user that holds the second credential transponds with the second credential and no trigger conditions exist for the second credential. Thus, the second credential does not transpond with personal information about the user.

The data structure 1200 includes a third record 1224 that defines how a third credential for the user transponds to other users. The third record 1224 indicates that the third credential is for a Virginia Driver's License and that the third credential is not set to transpond. Accordingly, the third credential does not transpond, unless the user provides input to explicitly indicate that the third credential should transpond. The third record 1224 does include details of how the third credential will transpond to the extent the user provides input to explicitly indicate that the third credential should transpond. As shown, the third credential has user permissions set that the third credential transponds to all users, transponds to any location, and transponds from any location. In terms of timing, the third credential transponds anytime. Only information about the third credential of the user that holds the third credential transponds with the second credential and no trigger conditions exist for the third credential. Thus, the third credential does not transpond with personal information about the user.

The data structure 1200 includes a fourth record 1226 that defines how a fourth credential for the user transponds to other users. The fourth record 1226 indicates that the fourth credential is for a Doctor's License (e.g., a license to practice medicine issued by a state government) and that the fourth credential is set to transpond. The fourth credential has user permissions set that the fourth credential transponds to all users and transponds from any location of the user. However, the fourth credential only transponds to locations that are one hundred yards from the user. Therefore, the fourth credential only transponds a relatively short distance from the user and other users that are located far from the user will not be able to perceive the fourth credential in association with the user's location. In terms of timing, the fourth credential transponds anytime and transponds with the user's name and phone number. In addition, the fourth credential has a trigger condition set that indicates that the fourth credential transponds only when another user reports an emergency situation. In this example, the fourth credential only transponds when another user reports an emergency situation and the other user meets the other criteria that define how the credential transponds. Accordingly, the fourth credential only transponds when another user reports an emergency to the system 200 and is located within one hundred of the user. In this regard, the user has set the fourth credential to transpond when the user is in position to assist in an emergency situation, but does not generally transpond.

In some implementations, the fourth record 1226 may define the trigger condition such that the trigger condition overrides the other criteria that define how the credential transponds. In these implementations, the fourth credential always transponds to locations that are one hundred yards from the user, but also will transpond to a user located more than one hundred yards from the user when that user reports an emergency situation.

The data structure 1200 includes a fifth record 1228 that defines how a fifth credential for the user transponds to other users. The fifth record 1228 indicates that the fifth credential is for a Hospital Employee badge and that the fifth credential is set to transpond. The fifth credential has user permissions set that the fifth credential transponds to other users that are listed in a coworkers group defined by the user and transponds to any location. In addition, the fifth credential is set to transpond from locations of the user that are designated as Public Places. Thus, in transponding the fifth credential, the system 200 references map data that specifies areas that are Public Places (e.g., malls, public roadways, schools, parks, etc.), determines that the user is located in a Public Place, and transponds the fifth credential to other users included in the coworkers group (e.g., a list of other users that the user has designated as coworkers). In terms of timing, the fifth credential transponds Monday through Friday between the hours of eight in the morning to seven in the evening and transponds with the user's business profile (e.g., business contact information and a professional bio). In addition, the fifth credential has a trigger condition set that indicates that the fifth credential transponds from Private Places only when another user requests the credential and provides an appropriate password. Accordingly, the fifth credential generally transponds when the user is located in a Public Place, but requires a password condition to be met when the user is located in a Private Place. For example, the user may provide the password defined by the trigger condition to a subset of the other users listed in the coworkers group. In this example, when the user is located in a Private Place, the fifth credential does not transpond to the coworkers group, but members of the coworkers group are allowed to enter a password to override the transpond from location restriction. In this example, when a member in the coworkers group requests the credential when the user is located in a Private Place, the member is prompted for a password and the location of the user is only provided if the member enters the password defined by the trigger condition.

The data structure 1200 includes a sixth record 1230 that defines how a sixth credential for the user transponds to other users. The sixth record 1230 indicates that the sixth credential is for a Conference Attendee and that the sixth credential is set to transpond. The sixth credential has user permissions set that the sixth credential transponds to other users that hold the same credential of Conference Attendee. In addition, the sixth credential is set to transpond to locations that are within one mile of a Convention Center and to transpond when the user is located within one mile of the Convention Center. Thus, in transponding the sixth credential, the system 200 references map data, determines that the user is located within one mile of the Convention Center, and transponds the sixth credential to other users that hold the Conference Attendee credential and are located within one mile of the Convention Center. In terms of timing, the sixth credential transponds for forty-eight hours (e.g., the length of the convention) and transponds with the user's business profile (e.g., business contact information and a professional bio). No trigger conditions have been set for the sixth credential.

Although the data structure 1200 has been described as having six credentials, the data structure 1200 may have more or fewer credentials. In addition, the system 200 may maintain data structures similar to the data structure 1200 for each user of the system 200. Further, although several example data records have been described, the conditions for transponding a credential may include many other examples and permutations of the variables described throughout this disclosure for placing restrictions on how a credential transponds.

Referring again to FIG. 3, the system 200 maintains a location of a mobile computing device associated with the first user (340). For instance, the system 200 maintains a current location of the mobile computing device associated with the first user in association with the first user's account. The system 200 may maintain a single location of the first user or may maintain a series of past locations of the first user.

In some implementations, the system 200 may periodically request the mobile computing device associated with the first user to provide location information. In these implementations, responsive to a request, the mobile computing device determines its location (e.g., using Global Positioning System (GPS) technology) and responds to the request with the determined location. The system 200 receives the determined location and stores the determined location as the current location of the mobile computing device associated with the first user.

In some examples, the mobile computing device periodically determines its location (e.g., using GPS technology) and sends the determined location to the system 200 without prompting. In these examples, the system 200 periodically receives the determined location and stores the determined location as the current location of the mobile computing device associated with the first user. The system 200 also may monitor for receipt of the determined location from the mobile computing device and, to the extent the system 200 does not receive a determined location from the mobile computing device within a threshold period of time, the system 200 may request the location from the mobile computing device or indicate that an error condition has occurred.

The system 200 may maintain a location for each user of the system 200 that is transponding one or more credentials. The system 200 also may maintain timing information related to locations of the users of the system 200. The system 200 may use the timing information to convey how recently the location measurements of the users were measured. For instance, when providing location information, the system 200 may provide an indication of how recently the location information was measured by conveying the timing the measurement was taken with the location or color coding the location data with a color that corresponds to one of multiple different thresholds (e.g., red color for more than one day ago, orange color for between one hour and one day ago, yellow color for between one minute and one hour ago, and green color for less than one minute ago). The system 200 further may only provide locations that were measured within a threshold period of time (e.g., provide those locations measured within the last hour and discard all others).

The system 200 provides, to at least a second user, information about at least one credential held by the first user in association with an indication of the location of the mobile computing device associated with the first user (350). For instance, the system 200 determines at least one user to which a credential of the first user has been made available and sends the determined credential (or information about the determined credential) to the at least one user in association with the maintained location associated with the mobile computing device of the first user. The system 200 may provide the credential and associated location to all users of the system 200 or any subset of one or multiple users of the system 200 to which the credential has been made available.

The system 200 may make all of the credentials of the first user available or any subset of the credentials of the first user available. In addition, the system 200 may make different credentials available to different sets of users. For instance, the system 200 may make a first credential of the first user available to a first subset of the users of the system 200, make a second credential of the first user available to a second subset of the users of the system 200, and make a third credential of the first user available to a third subset of the users of the system 200. The system 200 may use the availability data described throughout this disclosure to determine users to whom to provide the credential in association with the location.

In addition, the system 200 may consider filtering criteria that defines which credentials users of the system desire to view. For example, some users may only desire to view certain types of credentials. In this example, the system 200 only provides the certain types of credentials to the users, even though availability data allows the users to view more credentials.

The system 200 may provide the information about at least one credential held by the first user in association with the indication of the location of the mobile computing device associated with the first user in a manner that allows the credential and associated location to be displayed by a mobile computing device of another user. The mobile computing device of the other user may simply display the credential of the first user with its location (e.g., using a text-based display) or may provide a visualization of credentials and associated locations for many different users at a single time. When providing a visualization of credentials and associated locations for many different users at a single time, the mobile computing device may display a map area that shows indications of credential type and associated locations over the course of the map area.

Figure 13:
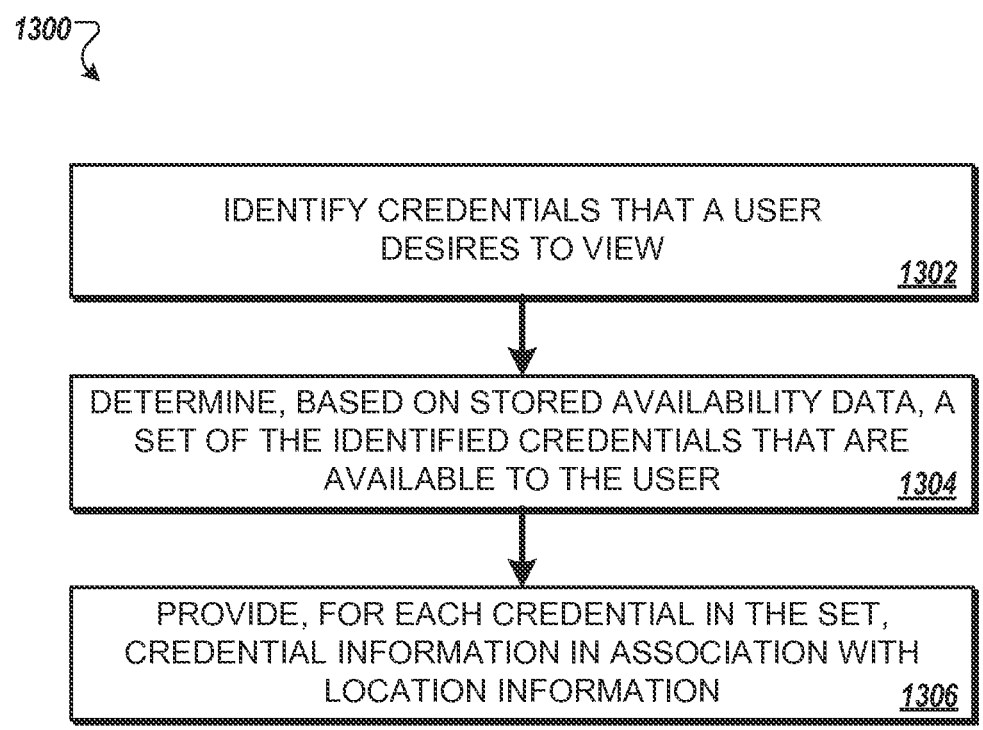
FIG. 13 is a flow chart illustrating an example process for providing credential information in association with location information.

FIG. 13 illustrates an example process 1300 for providing credential information in association with location information. The process 1300 may be used in providing information about at least one credential held by the first user in association with an indication of the location referenced above with respect to reference numeral 350. The operations of the process 1300 are described generally as being performed by the system 200. The operations of the process 1300 may be performed by one of the components of the system 200 (e.g., the server 208) or may be performed by a combination of the components of the system 200. In some implementations, operations of the process 1300 may be performed by one or more processors included in one or more electronic devices.

The system 200 identifies credentials that a user desires to view (1302). For instance, the system 200 receives user input selecting credentials that the user desires to view. The user input may select particular credentials of particular users that the user desires to view or the user input may select types of credentials the user desires to view. In this regard, the system 200 enables a user to filter credentials displayed by credential type.

In addition, the system 200 may receive location data that defines a location where the user desires to view credentials. The location data may define a static geographic region where the user desires to view credentials. The system 200 also may receive location data that defines a dynamic geographic region where the user desires to view credentials (e.g., a region that is within a one mile radius of the user).

The system 200 further may receive a triggering condition associated with a credential the user desires to view. The system 200 may process the triggering condition to determine whether to provide the desired credential to the user.

Figure 14:
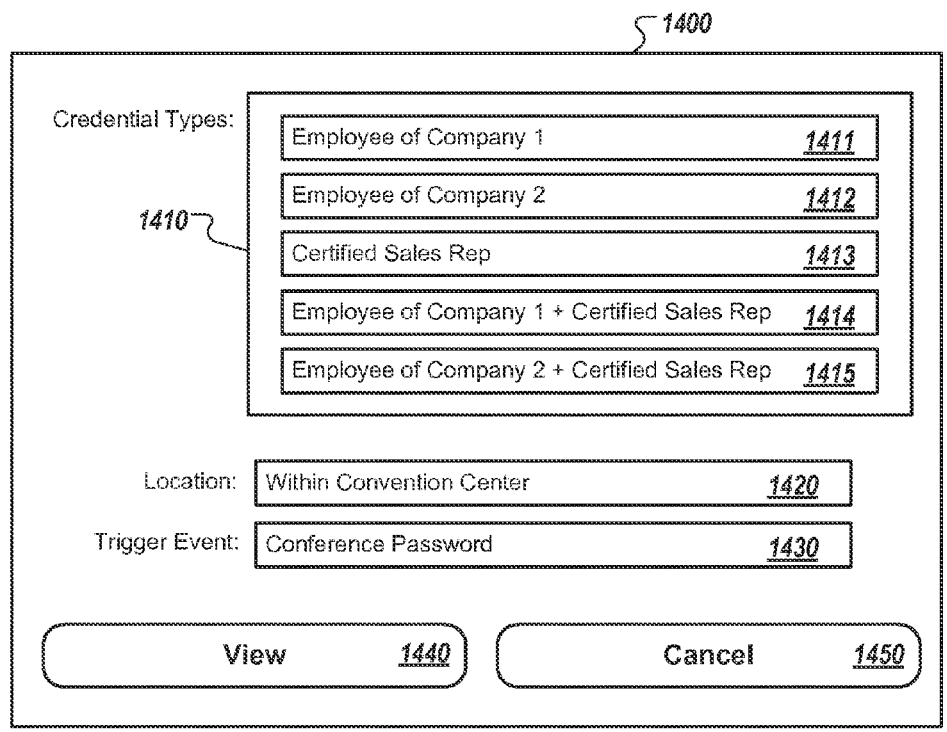
FIG. 14 is a diagram illustrating an example user interface for receiving user input that defines credentials that a user desires to view.

FIG. 14 illustrates an example user interface 1400 for receiving user input that defines credentials that a user desires to view. The example user interface 1400 may be used in identifying credentials that a user desires to view described above with respect to reference numeral 1302. The user interface 1400 includes a credential type selection area 1410 that receives user input defining which credentials a user would like to view. As shown, the credential type selection area 1410 has received input selecting to view users that hold the credential of Employee of a first Company 1411, users that hold the credential of Employee of a second Company 1412, users that hold the credential of a Certified Sales Representative 1413, users that hold the credential of Employee of a first Company and the credential of Certified Sales Representative 1414, and users that hold the credential of Employee of a second Company and the credential of Certified Sales Representative 1415. The credential type selection area 1410 defines how the user desires to filter credentials available to the user based on a type of the credential.

The user interface 1400 also includes a location area 1420 that receives user input defining how the user desires to filter credentials available to the user based on location of the available credentials. As shown, the location area 1420 has received user input indicating that the user only desires to view credentials of users that are located within a particular Convention Center.

The user interface 1400 further includes a trigger event area 1430 that receives user input of a trigger the user has provided to enable viewing of credentials where the holder of the credential requires a trigger event to occur before making the credential available. In this example, some users attending the conference have set a trigger condition that the credentials of the users are only available to other users that provide the conference password. Accordingly, because the user desires to view such credentials, the user has entered the conference password in the trigger event area 1430. Entry of the conference password in the trigger event area 1430 triggers transponding, to the user, of credentials that require the conference password and that would not transpond to the user prior to entry of the password.

The user interface 1400 includes a view button 1440 and a cancel button 1450. The view button 1440 causes display of credentials that are available to the user in accordance with the filtering criteria entered in the user interface 1400. The cancel button 1450 stops the process of viewing credentials and exits the user interface 1400 without displaying credentials.

Referring again to FIG. 13, the system 200 determines, based on stored availability data, a set of the identified credentials that are available to the user (1304). For instance, the system 200 compares the identified credentials that the user desires to view with availability data for the identified credentials. Based on the comparison, the system 200 determines a set of credentials that the user desires to view and that have been made available to the user. The set of credentials may include all of the credentials the user desires to view or any subset of credentials that the user desires to view.

The system 200 provides, for each credential in the set, credential information in association with location information (1306). For instance, the system 200 sends, to the user, an indication of each credential in the set with a location of the user that holds the credentials. The system 200 may use techniques similar to those described above with respect to reference numeral 350 to provide credential information in association with location information.

Figure 15:
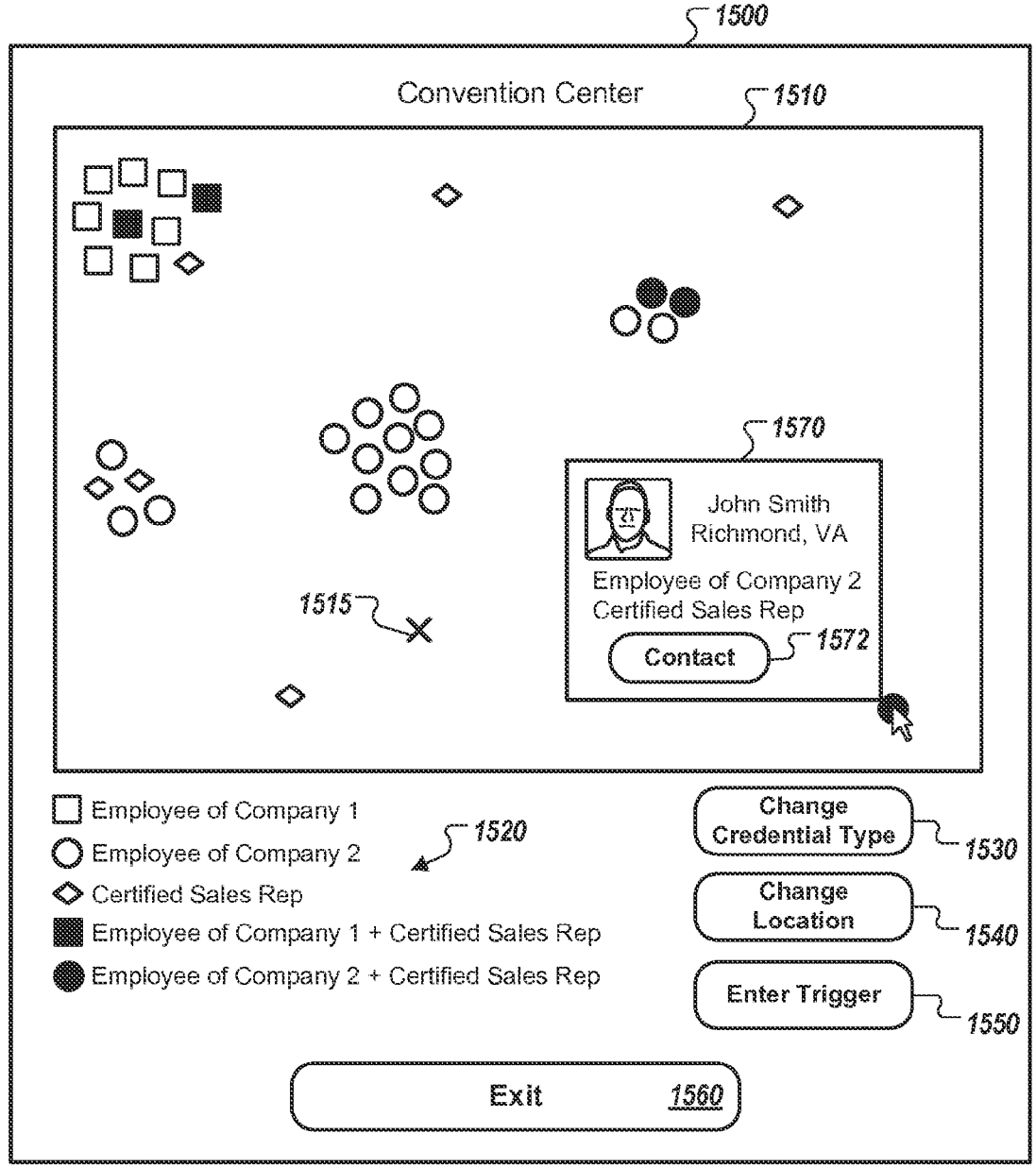
FIG. 15 is a diagram illustrating an example of a user interface for providing credential information in association with location information.

FIG. 15 illustrates an example of providing credential information in association with location information. The example shown in FIG. 15 may be used in providing credential information in association with location information described above with respect to reference numeral 1306. The example shown in FIG. 15 includes an interface 1500 that is displayed when the view button 1440 shown in FIG. 14 is selected.

The interface 1500 includes a map area 1510 that represents an area that corresponds to the Convention Center. The map area 1510 is displayed as an area that corresponds to the Convention Center because the user indicated in the location area 1420 that the user only desires to view credentials of users that are located within the Convention Center. The map area 1510 displays locations of the credentials of users located within the Convention Center that are available to the user and that meet the filtering criteria specified by the user in the user interface 1400. For instance, users having other credential types that are available to the user may be located within the Convention Center, but not displayed because the other credential types do not meet the filtering criteria specified by the user. In addition, users having the credential types specified by the user may be located within the Convention Center, but not displayed because the holders of those credentials have placed restrictions on transponding of those credentials such that those credentials are not available to the user (e.g., the credentials are not set to transpond or have user permissions set that the user does not meet).

The map area 1510 includes a user indication 1515 that shows a location of the user within the Convention Center. The user indication 1515 may be helpful in assisting the user in determining the user's position relative to other users in the Convention Center that have the displayed credential types.

The interface 1500 further includes a legend 1520 that shows how each credential type is displayed in the map area 1510. As shown, an unfilled square indicator is used to designate users that hold the credential of Employee of the first Company, but not the credential of Certified Sales Representative. An unfilled circle indicator is used to designate users that hold the credential of Employee of the second Company, but not the credential of Certified Sales Representative. An unfilled diamond indicator is used to designate users that hold the credential of Certified Sales Representative, but not the credential of Employee of the first Company or the credential of Employee of the second Company. A filled square indicator is used to designate users that hold the credential of Employee of the first Company and Certified Sales Representative. A filled circle indicator is used to designate users that hold the credential of Employee of the second Company and Certified Sales Representative.

In addition, the interface 1500 includes a change credential type button 1530, a change location button 1540, and an enter trigger button 1550. The change credential type button 1530 receives user input to display an interface that enables the user viewing the interface 1500 to change the types of credentials displayed. The change location button 1540 receives user input to display an interface that enables the user viewing the interface 1500 to change the location of the credentials that are displayed. The enter trigger button 1550 receives user input to display an interface that enables the user viewing the interface 1500 to enter a trigger event in an attempt to cause display of additional credentials that require a trigger condition to be made available.

The interface 1500 includes an exit button 1560. The exit button 1560 receives user input to stop viewing credentials and causes the interface 1500 to be removed from display.

The user viewing the interface 1500 is able to view the map area 1510 to perceive locations of other users within the Convention Center that have the credential types that the user desires to view. The user is able to interact with the map area 1510 to view additional information of the other users within the Convention Center that have the credential types that the user desires to view. For instance, as shown, the user has placed a cursor over a filled in circle indicator located at the bottom right portion of the map area 1510. Based on placing the cursor over the filled in circle indicator located at the bottom right portion of the map area 1510, the system 200 has displayed a pop up interface 1570 that provides additional information about the other user that holds the credentials associated with the filled in circle indicator (e.g., Employee of the second Company and Certified Sales Representative). As shown, the pop up interface 1570 displays a picture of the other user, the name of the other user, that the other is from Richmond, Va., and that the other user holds the credentials of Employee of the second Company and Certified Sales Representative. The pop up interface 1570 also includes a contact button 1572 that receives user input to initiate an electronic communication from the user viewing the interface 1500 and the other user for which the pop up interface 1570 is displayed. In this regard, the user viewing the interface 1500 may use the contact button 1572 in an attempt to meet and connect with the other user for which the pop up interface 1570 is displayed.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   maintaining, by a server system, data indicative of electronic credentials held by multiple different users;
   receiving, by the server system, selection data that indicates how credential data of a first user included in the multiple different users is to be made available to other users included in the multiple different users and that indicates a location of a mobile device associated with the first user included in the multiple different user identities where the mobile device associated with the first user included in the multiple different user identities is to be located to make available the credential data to the other users included in the multiple different users;
   based on the selection data, storing, by the server system, availability data that indicates how credential data of the first user included in the multiple different users is to be made available to the other users included in the multiple different users and that indicates the location of the mobile device associated with the first user included in the multiple different user identities where the mobile device associated with the first user is to be located to make available the credential data to the other users included in the multiple different users;

maintaining, by the server system, a current location of the mobile computing device associated with the first user;

determining that the current location of the mobile device associated with the first user corresponds to the location of the mobile device associated with the first user included in the multiple different user identities where the mobile device associated with the first user is to be located to make available the credential data to the other users included in the multiple different users; and based on the availability data and on determining that the current location of the mobile device associated with the first user corresponds to the location of the mobile device associated with the first user included in the multiple different user identities where the mobile device associated with the first user is to be located to make available the credential data to the other users included in the multiple different users the location of the mobile computing device associated with the first user, providing, to at least a second user included in the multiple different users, information about at least one credential held by the first user in association with an indication of the current location of the mobile computing device associated with the first user.

2. The method of claim 1, wherein:

receiving selection data comprises receiving user permissions that define users to which the credential data of the first user is available, storing availability data comprises, based on the user permissions, storing availability data that indicates the users to which the credential data of the first user is available, and providing information about at least one credential held by the first user in association with an indication of the location of the mobile computing device associated with the first user comprises:

determining, based on the availability data that indicates the users to which the credential data of the first user is available, that the second user is one of the users to which the credential data of the first user is available; and based on the determination that the second user is one of the users to which the credential data of the first user is available, providing, to the second user, information about at least one credential held by the first user in association with an indication of the current location of the mobile computing device associated with the first user.

3. The method of claim 1, wherein:

receiving selection data comprises receiving destination data that defines one or more locations where the credential data of the first user is available, storing availability data comprises, based on the destination data, storing availability data that indicates the one or more locations where the credential data of the first user is available, and providing information about at least one credential held by the first user in association with an indication of the current location of the mobile computing device associated with the first user comprises:

determining a location of the second user;

comparing the location of the second user to the one or more locations where the credential data of the first user is available;

determining, based on the comparison, that the location of the second user corresponds to the one or more locations where the credential data of the first user is available; and based on the determination that the location of the second user corresponds to the one or more locations where the credential data of the first user is available, providing, to the second user, information about at least one credential held by the first user in association with an indication of the current location of the mobile computing device associated with the first user.

4. The method of claim 1, wherein:

receiving selection data comprises receiving timing data that defines times at which the credential data of the first user is available, storing availability data comprises, based on the timing data, storing availability data that indicates the times at which the credential data of the first user is available, and providing information about at least one credential held by the first user in association with an indication of the current location of the mobile computing device associated with the first user comprises:

determining a time when credential data of the first user is requested by the second user;

comparing the time when credential data of the first user is requested by the second user to the times at which the credential data of the first user is available;

determining, based on the comparison, that the time when credential data of the first user is requested by the second user corresponds to the times at which the credential data of the first user is available; and based on the determination that the time when credential data of the first user is requested by the second user corresponds to the times at which the credential data of the first user is available, providing, to the second user, information about at least one credential held by the first user in association with an indication of the current location of the mobile computing device associated with the first user.

5. The method of claim 1, wherein:

receiving selection data comprises receiving a triggering condition that defines an event that triggers availability of the credential data of the first user;

storing availability data comprises, based on the triggering condition, storing availability data that indicates the event that triggers availability of the credential data of the first user; and providing information about at least one credential held by the first user in association with an indication of the current location of the mobile computing device associated with the first user comprises:

detecting the event that triggers availability of the credential data of the first user; and based on the detection of the event that triggers availability of the credential data of the first user, providing, to the second user, information about at least one credential held by the first user in association with an indication of the current location of the mobile computing device associated with the first user.

6. The method of claim 1, wherein maintaining a current location of a mobile computing device associated with the first user comprises:

periodically receiving, from the mobile computing device associated with the first user, an indication of a current location of the mobile computing device associated with the first user; and storing the received indication of the current location of the mobile computing device associated with the first user.

7. The method of claim 1, wherein maintaining a current location of a mobile computing device associated with the first user comprises:

periodically requesting, from the mobile computing device associated with the first user, an indication of a current location of the mobile computing device associated with the first user;

receiving, responsive to a request, an indication of a current location of the mobile computing device associated with the first user, and storing the received indication of the current location of the mobile computing device associated with the first user.

8. The method of claim 1, wherein maintaining data indicative of credentials held by multiple different users comprises:

receiving, from the first user, a first request to add a first type of credential to an account of the first user on the server system, the first type of credential being granted by a first credential granting authority;

based on the first request to add the first type of credential to the account of the first user on the server system, verifying with the first credential granting authority that the first credential granting authority has granted the first type of credential to the first user; and based on verifying with the first credential granting authority that the first credential granting authority has granted the first type of credential to the first user, adding the first type of credential to the account of the first user and enabling the first user to make the first type of credential available to other users.

9. The method of claim 1, wherein maintaining data indicative of credentials held by multiple different users comprises:

receiving, from the first user, a second request to add a second type of credential to the account of the first user on the server system, the second type of credential being granted by a second credential granting authority, the second type of credential being different than the first type of credential, and the second credential granting authority being different from the first credential granting authority;

based on the second request to add the second type of credential to the account of the first user on the server system, verifying with the second credential granting authority that the second credential granting authority has not granted the second type of credential to the first user; and based on verifying with the second credential granting authority that the second credential granting authority has not granted the second type of credential to the first user, denying the second request to add the second type of credential to the account of the first user and stopping the first user from making the second type of credential available to other users.

10. A system comprising:

one or more computers and one or more storage devices storing instructions that are operable, when executed by the one or more computers, to cause the one or more computers to perform operations comprising:

maintaining, by a server system, data indicative of electronic credentials held by multiple different users;

receiving, by the server system, selection data that indicates how credential data of a first user included in the multiple different users is to be made available to other users included in the multiple different users and that indicates a location of a mobile device associated with the first user included in the multiple different user identities where the mobile device associated with the first user included in the multiple different user identities is to be located to make available the credential data to the other users included in the multiple different users;

based on the selection data, storing, by the server system, availability data that indicates how credential data of the first user included in the multiple different users is to be made available to the other users included in the multiple different users and that indicates the location of the mobile device associated with the first user included in the multiple different user identities where the mobile device associated with the first user is to be located to make available the credential data to the other users included in the multiple different users;

maintaining, by the server system, a current location of the mobile computing device associated with the first user;

determining that the current location of the mobile device associated with the first user corresponds to the location of the mobile device associated with the first user included in the multiple different user identities where the mobile device associated with the first user is to be located to make available the credential data to the other users included in the multiple different users; and based on the availability data and on determining that the current location of the mobile device associated with the first user corresponds to the location of the mobile device associated with the first user included in the multiple different user identities where the mobile device associated with the first user is to be located to make available the credential data to the other users included in the multiple different users the location of the mobile computing device associated with the first user, providing, to at least a second user included in the multiple different users, information about at least one credential held by the first user in association with an indication of the current location of the mobile computing device associated with the first user.

11. The system of claim 10, wherein:

receiving selection data comprises receiving user permissions that define users to which the credential data of the first user is available, storing availability data comprises, based on the user permissions, storing availability data that indicates the users to which the credential data of the first user is available, and providing information about at least one credential held by the first user in association with an indication of the location of the mobile computing device associated with the first user comprises:

determining, based on the availability data that indicates the users to which the credential data of the first user is available, that the second user is one of the users to which the credential data of the first user is available; and based on the determination that the second user is one of the users to which the credential data of the first user is available, providing, to the second user, information about at least one credential held by the first user in association with an indication of the current location of the mobile computing device associated with the first user.

12. The system of claim 10, wherein:
receiving selection data comprises receiving destination data that defines one or more locations where the credential data of the first user is available,
storing availability data comprises, based on the destination data, storing availability data that indicates the one or more locations where the credential data of the first user is available, and
providing information about at least one credential held by the first user in association with an indication of the current location of the mobile computing device associated with the first user comprises:
  determining a location of the second user;
  comparing the location of the second user to the one or more locations where the credential data of the first user is available;
  determining, based on the comparison, that the location of the second user corresponds to the one or more locations where the credential data of the first user is available; and
  based on the determination that the location of the second user corresponds to the one or more locations where the credential data of the first user is available, providing, to the second user, information about at least one credential held by the first user in association with an indication of the current location of the mobile computing device associated with the first user.

13. The system of claim 10, wherein:
receiving selection data comprises receiving timing data that defines times at which the credential data of the first user is available,
storing availability data comprises, based on the timing data, storing availability data that indicates the times at which the credential data of the first user is available, and
providing information about at least one credential held by the first user in association with an indication of the current location of the mobile computing device associated with the first user comprises:
  determining a time when credential data of the first user is requested by the second user;
  comparing the time when credential data of the first user is requested by the second user to the times at which the credential data of the first user is available;
  determining, based on the comparison, that the time when credential data of the first user is requested by the second user corresponds to the times at which the credential data of the first user is available; and
  based on the determination that the time when credential data of the first user is requested by the second user corresponds to the times at which the credential data of the first user is available, providing, to the second user, information about at least one credential held by the first user in association with an indication of the current location of the mobile computing device associated with the first user.

14. The system of claim 10, wherein:
receiving selection data comprises receiving a triggering condition that defines an event that triggers availability of the credential data of the first user;
storing availability data comprises, based on the triggering condition, storing availability data that indicates the event that triggers availability of the credential data of the first user; and
providing information about at least one credential held by the first user in association with an indication of the current location of the mobile computing device associated with the first user comprises:
  detecting the event that triggers availability of the credential data of the first user; and
  based on the detection of the event that triggers availability of the credential data of the first user, providing, to the second user, information about at least one credential held by the first user in association with an indication of the current location of the mobile computing device associated with the first user.

15. The system of claim 10, wherein maintaining a current location of a mobile computing device associated with the first user comprises:
periodically receiving, from the mobile computing device associated with the first user, an indication of a current location of the mobile computing device associated with the first user; and
storing the received indication of the current location of the mobile computing device associated with the first user.

16. The system of claim 10, wherein maintaining a current location of a mobile computing device associated with the first user comprises:
periodically requesting, from the mobile computing device associated with the first user, an indication of a current location of the mobile computing device associated with the first user;
receiving, responsive to a request, an indication of a current location of the mobile computing device associated with the first user, and
storing the received indication of the current location of the mobile computing device associated with the first user.

17. The system of claim 10, wherein maintaining data indicative of credentials held by multiple different users comprises:
receiving, from the first user, a first request to add a first type of credential to an account of the first user on the server system, the first type of credential being granted by a first credential granting authority;
based on the first request to add the first type of credential to the account of the first user on the server system, verifying with the first credential granting authority that the first credential granting authority has granted the first type of credential to the first user; and
based on verifying with the first credential granting authority that the first credential granting authority has granted the first type of credential to the first user, adding the first type of credential to the account of the first user and enabling the first user to make the first type of credential available to other users.

18. The system of claim 10, wherein maintaining data indicative of credentials held by multiple different users comprises:
receiving, from the first user, a second request to add a second type of credential to the account of the first user on the server system, the second type of credential being granted by a second credential granting authority, the second type of credential being different than the first type of credential, and the second credential granting authority being different from the first credential granting authority;

based on the second request to add the second type of credential to the account of the first user on the server system, verifying with the second credential granting authority that the second credential granting authority has not granted the second type of credential to the first user; and based on verifying with the second credential granting authority that the second credential granting authority has not granted the second type of credential to the first user, denying the second request to add the second type of credential to the account of the first user and stopping the first user from making the second type of credential available to other users.

19. A non-transitory computer-readable medium storing software comprising instructions executable by one or more computers which, upon such execution, cause the one or more computers to perform operations comprising:

maintaining, by a server system, data indicative of electronic credentials held by multiple different users;

receiving, by the server system, selection data that indicates how credential data of a first user included in the multiple different users is to be made available to other users included in the multiple different users and that indicates a location of a mobile device associated with the first user included in the multiple different user identities where the mobile device associated with the first user included in the multiple different user identities is to be located to make available the credential data to the other users included in the multiple different users;

based on the selection data, storing, by the server system, availability data that indicates how credential data of the first user included in the multiple different users is to be made available to the other users included in the multiple different users and that indicates the location of the mobile device associated with the first user included in the multiple different user identities where the mobile device associated with the first user is to be located to make available the credential data to the other users included in the multiple different users;

maintaining, by the server system, a current location of the mobile computing device associated with the first user;

determining that the current location of the mobile device associated with the first user corresponds to the location of the mobile device associated with the first user included in the multiple different user identities where the mobile device associated with the first user is to be located to make available the credential data to the other users included in the multiple different users; and based on the availability data and on determining that the current location of the mobile device associated with the first user corresponds to the location of the mobile device associated with the first user included in the multiple different user identities where the mobile device associated with the first user is to be located to make available the credential data to the other users included in the multiple different users the location of the mobile computing device associated with the first user, providing, to at least a second user included in the multiple different users, information about at least one credential held by the first user in association with an indication of the current location of the mobile computing device associated with the first user.

20. The medium of claim 19, wherein:

receiving selection data comprises receiving user permissions that define users to which the credential data of the first user is available, storing availability data comprises, based on the user permissions, storing availability data that indicates the users to which the credential data of the first user is available, and providing information about at least one credential held by the first user in association with an indication of the location of the mobile computing device associated with the first user comprises:

determining, based on the availability data that indicates the users to which the credential data of the first user is available, that the second user is one of the users to which the credential data of the first user is available; and based on the determination that the second user is one of the users to which the credential data of the first user is available, providing, to the second user, information about at least one credential held by the first user in association with an indication of the current location of the mobile computing device associated with the first user.

* * * * *